United States Patent
Ogi et al.

(10) Patent No.: US 11,949,832 B2
(45) Date of Patent: *Apr. 2, 2024

(54) IMAGE SENSOR UNIT WITH ERECTING EQUAL-MAGNIFICATION LENS ARRAY HAVING A LENS WITH OPTICALLY DISCONTINUOUS PORTION

(71) Applicant: Nippon Sheet Glass Company, Limited, Tokyo (JP)

(72) Inventors: Shuya Ogi, Sagamihara (JP); Eiichi Nakaoka, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/979,871

(22) Filed: Nov. 3, 2022

(65) Prior Publication Data

US 2023/0055491 A1 Feb. 23, 2023

Related U.S. Application Data

(63) Continuation of application No. 15/849,899, filed on Dec. 21, 2017, now Pat. No. 11,523,022.

(30) Foreign Application Priority Data

Dec. 22, 2016 (JP) ................................ 2016-249709

(51) Int. Cl.
*H04N 1/031* (2006.01)
*H04N 1/03* (2006.01)

(52) U.S. Cl.
CPC ......... *H04N 1/0312* (2013.01); *H04N 1/0306* (2013.01); *H04N 2201/02487* (2013.01)

(58) Field of Classification Search
None
See application file for complete search history.

(56) References Cited

U.S. PATENT DOCUMENTS 4,712,901 A * 12/1987 Ohtaka ............... G02B 3/0062
396/114
5,978,146 A * 11/1999 Kittaka ............... G02B 3/0087
359/652

(Continued)

FOREIGN PATENT DOCUMENTS

CN 101183080 A 5/2008
CN 102017596 A 4/2011

(Continued)

OTHER PUBLICATIONS

English Translation of Ioka Akio, JP H03-179315 (1991).
Search Report dated Mar. 27, 2020, from the State Intellectual Property Office of the P.R.C in application No. 2017113736498.

*Primary Examiner* — Miya J Cato
*Assistant Examiner* — Pawan Dhingra
(74) *Attorney, Agent, or Firm* — Sughrue Mion, PLLC

(57) ABSTRACT

There is provided a method of manufacturing an image sensor unit, the image sensor unit including: a linear light source that illuminates a document along a main scanning direction; a rod lens array that includes a plurality of rod lenses arranged in the main scanning direction and condenses a light reflected from the document; and a linear image sensor that receives a light condensed by the rod lens array. When a rod lens having an optically discontinuous portion on a surface and/or interior of the rod lens is included, the rod lens array is arranged such that the optically discontinuous portion is not located toward the document.

6 Claims, 26 Drawing Sheets

(56) References Cited

U.S. PATENT DOCUMENTS

| | | | | |
|---|---|---|---|---|
| 6,760,139 B2* | 7/2004 | Spears | ............... | G02B 26/10 |
| | | | | 359/223.1 |
| 7,120,309 B2* | 10/2006 | Garcia | ............... | G02B 13/22 |
| | | | | 352/160 |
| 8,576,459 B2* | 11/2013 | Nagata | ............... | G02B 3/005 |
| | | | | 358/475 |
| 2010/0323105 A1* | 12/2010 | Hosoe | ............... | B29C 45/14418 |
| | | | | 264/2.7 |
| 2011/0007368 A1* | 1/2011 | Saito | ............... | H04N 1/0312 |
| | | | | 358/475 |
| 2011/0043872 A1* | 2/2011 | Mamada | ............ | G02B 27/0961 |
| | | | | 359/622 |
| 2012/0314309 A1* | 12/2012 | Tatebayashi | ............ | G02B 7/021 |
| | | | | 359/819 |
| 2013/0003142 A1* | 1/2013 | Nemoto | ............... | G02B 3/0062 |
| | | | | 264/2.7 |

FOREIGN PATENT DOCUMENTS

| | | |
|---|---|---|
| JP | H03-179315 A | 8/1991 |
| JP | 11-064605 A | 3/1999 |
| JP | 2008-145428 A | 6/2008 |

* cited by examiner

IMAGE SENSOR UNIT WITH ERECTING EQUAL-MAGNIFICATION LENS ARRAY HAVING A LENS WITH OPTICALLY DISCONTINUOUS PORTION

CROSS REFERENCE TO RELATED APPLICATIONS

This is a continuation application of U.S. application Ser. No. 15/849,899, filed on Dec. 21, 2017, which claims the benefit of priority from Japanese Patent Application No. 2016-249709, filed on Dec. 22, 2016; the disclosures of which are incorporated herein by reference.

BACKGROUND OF THE INVENTION

1. Field of the Invention

The present invention relates to a method of manufacturing an image sensor unit primarily used in an image reading device.

2. Description of the Related Art

In the related art, some image reading devices such as scanners are known to use an erecting equal-magnification optical system. The use of an erecting equal-magnification optical system can reduce the size of the image sensor unit better than reduction optical systems. An image sensor unit using an erecting equal-magnification optical system primarily comprises a linear light source, an erecting equal-magnification lens array, a linear image sensor, and a housing that fixes these components at predetermined positions.

An image sensor unit using an erecting equal-magnification optical system is designed such that the best optical performance is exhibited when the distance between the document and the erecting equal-magnification lens array is identical to the distance between the erecting equal-magnification lens array and the linear image sensor. If the distances are not identical, the optical performance will be poor due to blurred images. Therefore, in consideration of the fact that a document is planar, the erecting equal-magnification lens array and the linear image sensor are built in the housing in a linear fashion such that they are parallel to the document.

An erecting equal-magnification optical system is exemplified by a SELFOC Lens Array (SLA, SELFOC is a registered trademark of Nippon Sheet Glass Co. Ltd.), which is a form of rod lens array including a large number of rod lenses arranged in the main scanning direction and integrated with each other, each of the rod lens including a columnar graded index glass rod having a higher refraction index at the center. Other known examples include a resin rod lens array including a large number of graded index resin rod lenses arranged in the main scanning direction and integrated with each other, and a lens array plate or a stack thereof produced by forming a large number of convex lenses on the surface of a dielectric substrate plate.

Among the various types, SLA is extensively used in the aforementioned applications. SLA is not only highly durable due to the glass material but the optical performance thereof is extremely high as compared to other optical systems (see, for example, patent document 1). Resin rod lens arrays are also used extensively because of their low prices.

[patent document 1] JPH11-64605

Optical systems used in scanners and image reading applications are required to exhibit extremely high imaging performance and contrast performance. Therefore, depending on the required performance and quality, a high standard is also required in regard to the defects and flaws on the surface and interior of the lens. In optical systems containing an optically discontinuous portion, etc. due to dents and losses of a groove shape such as chips, fractures, cracks, and scratches, a phenomenon outside the design such as a flare occurs due to unintended scattering, reflection, refraction, etc. at the interface or in the interior of the optically discontinuous portion, which could possibly result in a significant drop in the optical performance. Hence, a high standard for performance is required. It is also known that if an image sensor unit in which such an optical system is mounted is used to manufacture an image reading device, the optical performance is adversely affected. For example, white streaks appear in read images, or the contrast is degraded due to an impact from a flare.

SUMMARY OF THE INVENTION

The present invention addresses the issue and a purpose thereof is to provide a method of manufacturing an image sensor unit capable of preventing the optical performance from being degraded even if an erecting equal-magnification lens array including an optically discontinuous portion on the surface or interior of the lens is used in the image sensor unit.

The method of manufacturing an image sensor unit according to at least one embodiment of the present invention is adapted for an image sensor unit comprising: a linear light source that illuminates a document placed on an original platen glass along a main scanning direction; an erecting equal-magnification lens array that includes a plurality of single lenses arranged in the main scanning direction and condenses a light reflected from the document; and a linear image sensor that receives a light condensed by the erecting equal-magnification lens array. When the single lenses constituting the erecting equal-magnification lens array include a single lens having an optically discontinuous portion on at least one of an incident face, a emission face and an interior of the single lens, the erecting equal magnification lens array is arranged such that an interface of the optically discontinuous portion, extending from an end face of the single lens facing the document toward the linear image sensor and in a direction away from a direction in which illuminating light from the linear light source is incident on the original platen glass, is not located toward the document.

The main scanning direction of the linear light source is the longitudinal direction of the linear light source. The linear light source substantially evenly irradiates a document with light (illuminating light) linearly along the longitudinal direction. The main scanning direction of the erecting equal-magnification lens array is the longitudinal direction of the erecting equal-magnification lens array. The erecting equal-magnification lens array condenses a light reflected from the document irradiated by the linear light source to create an erecting equal-magnification image on the linear image sensor.

According to the embodiment, the optical performance is prevented from being degraded due to any optically discontinuous portion located in/on the erecting equal-magnification lens array. It is therefore possible to provide an image sensor unit that allows, when used in an image processing device, obtaining read images of favorable quality.

In further accordance with the embodiment, an image sensor unit and an image reading device can be manufactured without degrading the optical performance even if the erecting equal-magnification lens array includes a quality defect such as a crack, chip, scratch, etc. that forms an optically discontinuous portion. Erecting equal-magnification lens arrays and image sensor units that were hitherto disposed of as rejected products due to the defect can be regenerated or saved so that the substantial fabrication yield is improved and the manufacturing cost is reduced.

The linear light source may be adjacent to the erecting equal-magnification lens array, and an irradiation surface of the linear light source is arranged to face an intersection between an optical axis of the erecting equal-magnification lens array and a top surface of the original platen glass.

When the single lenses constituting the erecting equal-magnification lens array include a single lens having an optically discontinuous portion on at least one of an incident face, a emission face and an interior of the single lens, the erecting equal magnification lens array may be arranged such that the optically discontinuous portion is located toward the linear image sensor.

An optically discontinuous portion, if present in a light path, causes light rays to undergo unintended scattering, refraction, reflection, attenuation, etc. An optically discontinuous portion may accompany an irregularity or a loss and adversely affects the optical performance. The optically discontinuous portion may be at least one of a chip, fracture, crack, cleavage, striae, pit, and scratch. In many manufacturing scenes, erecting equal-magnification lens arrays that include an optically discontinuous portion as described above are systematically removed in an inspection step according to a given standard. A lens surface also represents a discontinuous interface between a lens medium and air, etc. However, a lens surface does not initiate unintended refraction, reflection, etc. and produces optical performance expected in the design by providing refraction at the interface. Therefore, a lens surface is not designated as an optically discontinuous portion in this specification.

The erecting equal-magnification lens array may be a rod lens array including a plurality of rod lenses. The plurality of rod lenses may be arranged in a single line in the main scanning direction.

A direction angle of the interface of the optically discontinuous portion may be less than 20°. As described later, a direction angle of the interface of an optically discontinuous portion of less than 20° is likely to degrade the optical performance. The optical performance is prevented from being degraded by arranging the interface of an optically discontinuous portion having a direction angle of less than 20° so as not to be located toward the document.

Optional combinations of the aforementioned constituting elements, and implementations of the invention in the form of methods, apparatuses, etc. may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
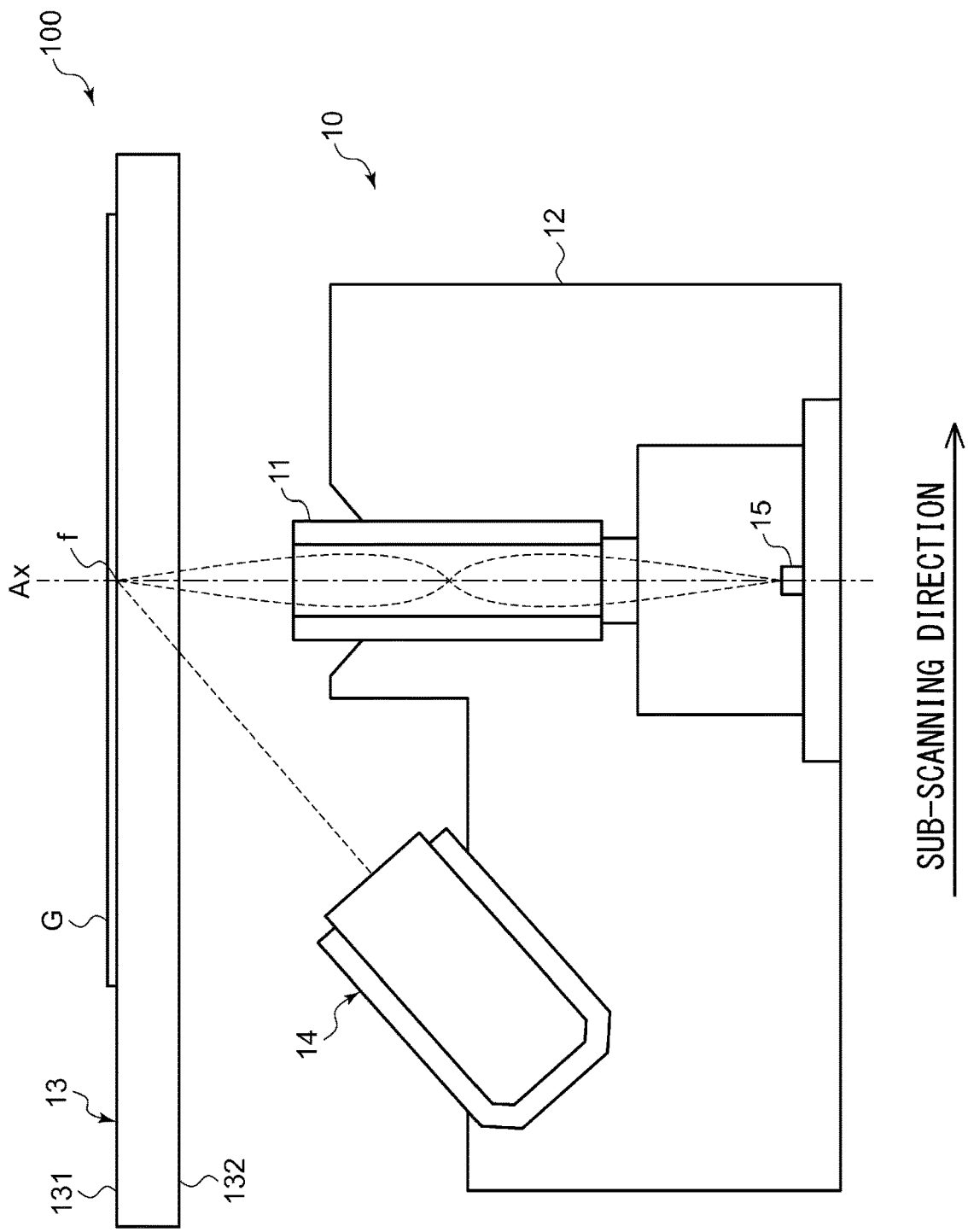
FIG. 1 shows an image reading device in which an image sensor unit according to the embodiment of the present invention is used.

FIG. 1 shows an image reading device 100 in which an image sensor unit 10 according to the embodiment of the present invention is used. The image sensor unit 10 is elongated in a direction perpendicular to the paper surface and FIG. 1 shows a cross section of the image sensor unit 10 revealed by cutting the image sensor unit 10 by a plane parallel to the surface of the paper. As shown in FIG. 1, the image reading device 100 comprises an image sensor unit 10, an original platen glass 13 configured to support a document G on a top surface 131, a driving mechanism (not shown) for driving the image sensor unit 10, and an image processing unit (not shown) for processing data read by the image sensor unit 10.

The image sensor unit 10 comprises a linear light source 14 for illuminating a document G placed on the original platen glass 13, an erecting equal-magnification lens array 11 for condensing a light reflected from the document G, a linear image sensor (photoelectric transducer) 15 for receiving light condensed by the erecting equal-magnification lens array 11, and a housing 12 that fixes these components.

Referring to FIG. 1, the direction of the arrow (direction parallel to the surface of the paper) represents the sub-scanning direction and the direction perpendicular to the sub-scanning direction is the main scanning direction. The erecting equal-magnification lens array 11 is elongated in the main scanning direction and a plurality of lenses are arranged in a single line or in two or more lines along the main scanning direction and are integrated with each other. The linear light source 14 is also elongated in the main scanning direction and illuminates the document linearly along the main scanning direction. The linear image sensor 15 includes a plurality of photoelectric transducers arranged on a substrate elongated in the main scanning direction and along the main scanning direction. The housing 12 is substantially rectangular in shape and elongated in the main scanning direction.

The housing 12 has the function of fixing the erecting equal-magnification lens array 11, the linear light source 14, and the linear image sensor 15 so as to maintain predetermined relative positions. These components elongated in the main scanning direction are arranged substantially parallel to the main scanning direction. The optical axis Ax of the erecting equal-magnification lens array 11 is arranged to be perpendicular to the principal surface of the original platen glass 13. Further, the linear light source is arranged such that the illumination light illuminates an area F including an intersection f between the optical axis Ax of the erecting equal-magnification lens array 11 and the top surface 131 evenly and most brightly. The linear image sensor 15 is fixed in the housing 12 such that it is located on the optical axis Ax and an erecting equal-magnification image of the intersection f is formed on the light receiving surface via the erecting equal-magnification lens array 11. The image sensor unit 10 is mounted to the image reading device 100 such that the image sensor unit 10 is driven in the sub-scanning direction.

In the image reading device 100, the illuminating light from the linear light source 14 irradiates the document G via the original platen glass 13. The image reading device 100 is capable of reading the document G by causing the erecting equal-magnification lens array 11 to condense a light reflected from the document G and forming an image of the light on the linear image sensor 15, and, is further capable of reading a desired area on the document G by causing the image sensor unit 10 to scan the document G in the sub-scanning direction relative to the original platen glass 13.

Described above is a schematic configuration of the image sensor unit 10 and the image reading device 100. A description will be given of a feature of the present invention.

In the image sensor unit 10 according to the embodiment, the surface and/or the interior of the lenses in the erecting equal-magnification lens array may include a chip, fracture, crack, cleavage, ripple mark, striae, pit, scratch, etc. which result in optically discontinuous portions. Such portions in an optical system may produce light due to scattering, refraction, or reflection outside the design. A chip, which is an example of optically discontinuous portion, is a generic term that generally refers to a pinhole and clamshell chip. A fractured portion inside the lens that is not dislocated from the lens surface but potentially creates a chip will also be referred to as a chip. An optically discontinuous portion is not limited to those referred to by the specific terms illustratively used above. The term refers to a portion that produces scattering, refraction, or reflection outside the design, or a portion that consequently creates a cause such as flare or ghost resulting in degradation of optical performance.

The manufacturing process of an erecting equal-magnification lens array such as an SLA made of glass may include cutting, grinding, polishing, etc. Due to the brittleness and characteristics inherent in the manufacturing steps of the glass material, an optically discontinuous portion such as a chip, fracture, crack, scratch, etc. may be created inside and outside the lens. A striae inside the lens is not directly relevant to the characteristics inherent in the manufacturing steps but is created due to unevenness in phase or composition when a glass having a certain composition is formed by a melting method or the like and is known to be a cause to induce unintended refraction of light, etc. outside the design.

The manufacturing process of a rod lens array including resin rod lenses arranged in the main scanning direction also includes, in many cases, a cutting step or a polishing step so that the same situation as that of the erecting equal-magnification lens array made of glass holds as regards an optically discontinuous portion, except that, due to the softness of the material, a scratch presents a problem more often than that in the case of glass rod lenses.

Meanwhile, a lens array plate produced by forming a plurality of convex lenses on at least one principal surface of a transparent dielectric substrate is primarily formed by a press process using a mold for injection molding, etc. The press molding seldom involves steps like polishing described above directly. However, an optically discontinuous portion exemplified above by a chip, fracture, crack, scratch, etc. may be created due to the condition of the mold or the condition of pressing. A sink may also be created inside and/or outside the lens depending on the condition during pressing. A sink is also known as a cause to induce unintended optical light refraction and so can be defined as an optically discontinuous portion.

Two examples of optically discontinuous portions of a rod lens will be discussed.

Figure 2A:
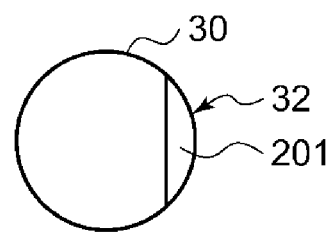
FIGS. 2A and 2B are schematic views of a rod lens including an optically discontinuous portion in the form of a chip.
Figure 2B:
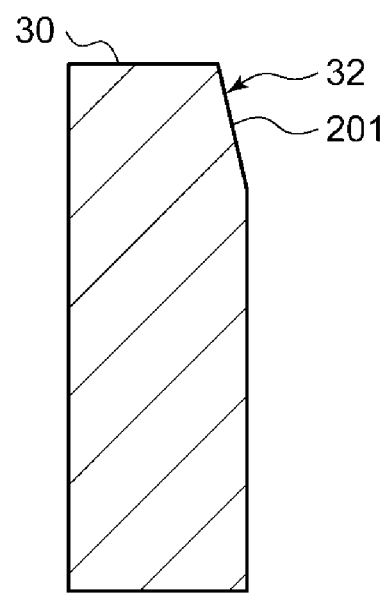

FIGS. 2A and 2B show a chip 32 created in a rod lens 30. FIG. 2A shows an end face of the rod lens 30, and FIG. 2B shows a cross section of the rod lens 30 revealed by cutting the rod lens 30 by a plane passing through the optical axis and parallel to the optical axis. As shown in FIGS. 2A and 2B, the chip 32 includes an interface 201 between the lens medium and air.

Figure 3A:
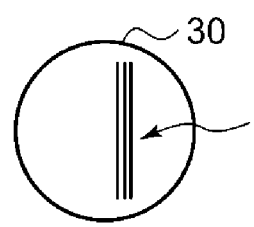
FIGS. 3A and 3B are schematic view of a rod lens including an optically discontinuous portion in the form of a scratch.
Figure 3B:
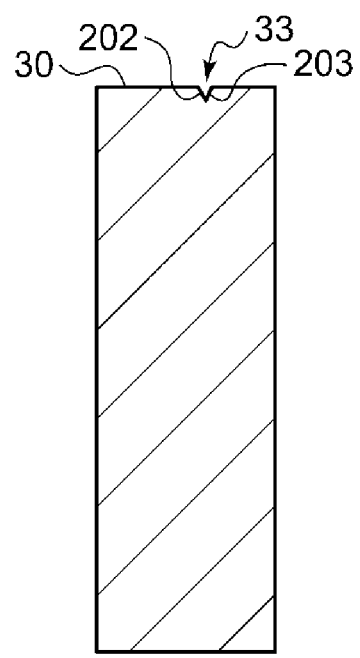

FIGS. 3A and 3B show a scratch 33 created in the rod lens 30. FIG. 3A shows an end face of the rod lens 30, and FIG. 3B shows a cross section of the rod lens 30 revealed by cutting the rod lens 30 by a plane passing through the optical axis and parallel to the optical axis. As shown in FIGS. 3A and 3B, the scratch 33 includes interfaces 202 and 203 between the lens medium and air.

The figures show that the two examples of optically discontinuous portions (i.e., the chip 32 and the scratch 33) include an interface that induces light refraction, reflection, etc. It should be noted that other optically discontinuous portions having a similar behavior are also targeted by the present invention.

Figure 4:
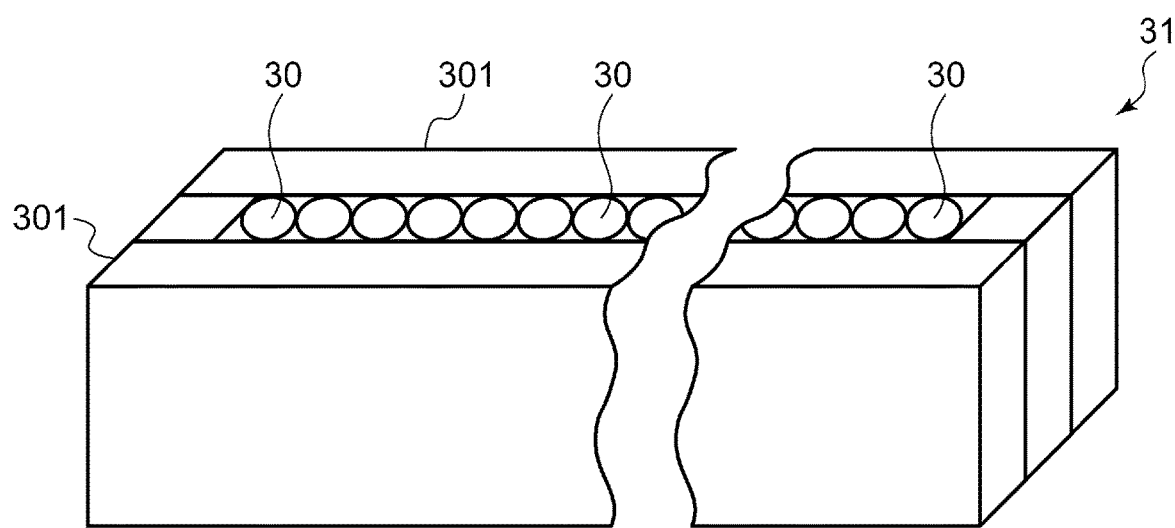
FIG. 4 is a schematic view of a rod lens array used in a simulation.

A simulation was conducted to see how the optical performance is affected when an erecting equal-magnification lens array including a lens with an optically discontinuous portion is built into the erecting equal-magnification lens array. By way of example of the erecting equal-magnification lens array 11, a rod lens array including an array of graded index rod glass lenses (SLA12E rod lens array from Nippon Sheet Glass Co. Ltd. (an individual lens has a lens aperture angle of 12°, effective diameter of 0.28 mm, pitch of lens arrangement of 0.3 mm)) arranged in a single line, the number of lenses included in the array being 21, is used. FIG. 4 is a schematic view of a rod lens array 31 described above. The side surfaces of the glass rod lens 30 formed with a graded index inside are cladded for light absorption and/or coated black for light absorption (not shown). The cladding or coating rapidly attenuates light rays deviated from the light path as designed as they reach the neighborhood of the side surfaces and inhibits propagation inside the lens and emission from the lens, thereby preventing occurrence of a flare etc. that does not contribute to imaging. The rod lenses 30 are sandwiched by two side plates 301 made of an elongated, light absorbing fiber-reinforced plastic (FRP). In conducting a simulation, the rod lens array 31, the linear light source 14, the original platen glass 13, and the linear image sensor 15 are arranged according to the specification of the image sensor unit 10 as described with reference to FIG. 1.

Figure 5:
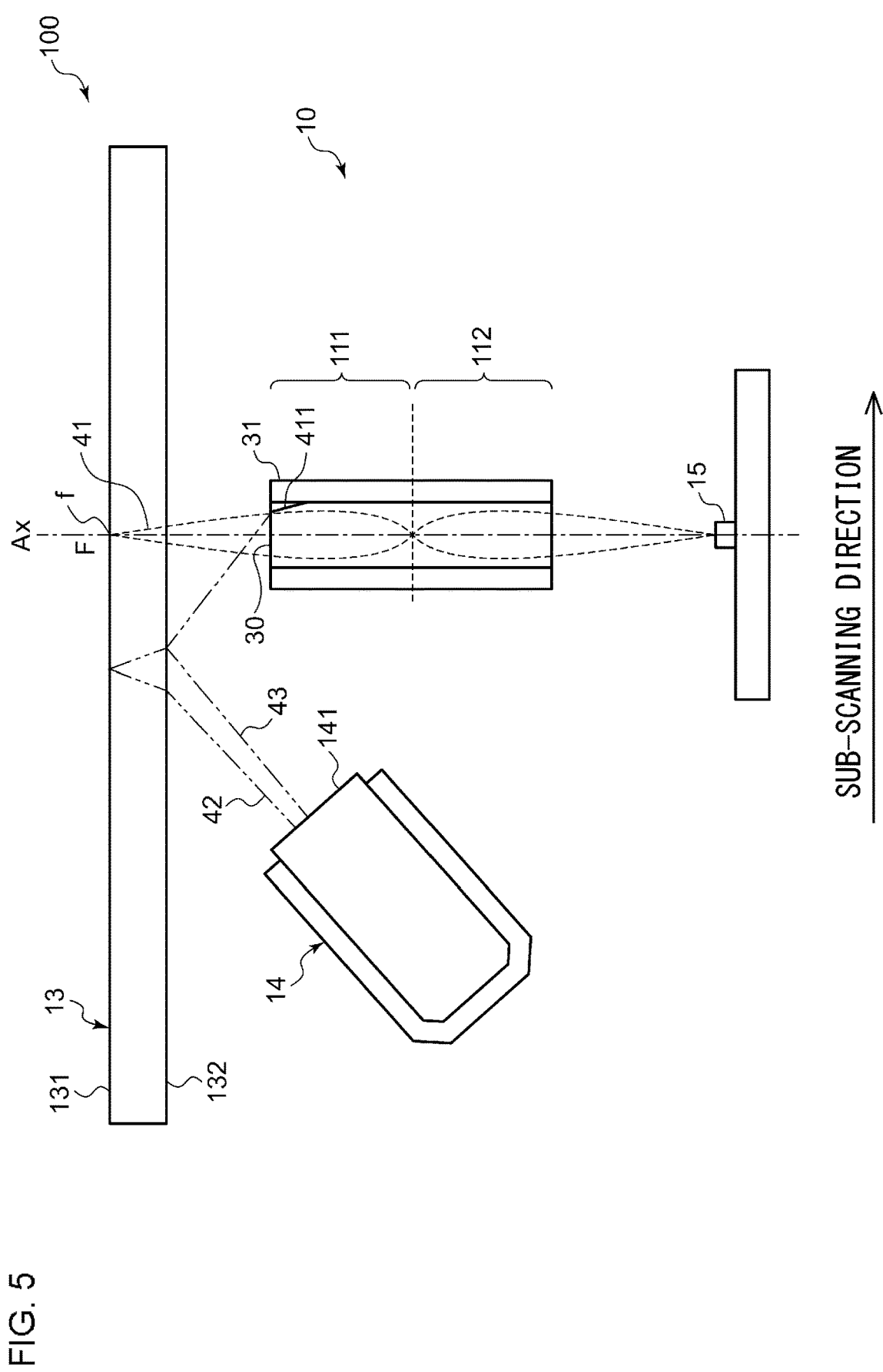
FIG. 5 is a schematic sectional view showing the image sensor and examples of light paths of light rays used in the simulation.

FIG. 5 is a diagram showing the arrangement of the components and pseudo light rays used in the simulation. The housing is irrelevant for the purpose of simulation and is omitted from the illustration in FIG. 5. In the simulation, regressivity of light is considered. Pseudo light rays are emitted from the linear image sensor 15 to travel a light path opposite to the light path expected in the actual image sensor unit, and the behavior of the light rays after impinging upon the optically discontinuous portion of the lens is determined by computation based on ray tracing. For pseudo light emission, a 5 micrometer by 5 micrometer square pixel of the linear image sensor is assumed as a pseudo light emission point and a model is conceived in which 10000 light rays with an even intensity having a wavelength of 530 nm are emitted at Lambertian 12°.

An optically discontinuous portion having an air layer of about 1 micrometer at the interface defined by the optically discontinuous portion is assumed. The lens is assumed to include the optically discontinuous portion with such an interface. For the purpose of identifying the location of the optically discontinuous portion in the lens, the thickness of the rod lens is sectioned right in the middle by a plane perpendicular to the optical axis of the lens as shown in FIG. 5. The optically discontinuous portion is identified as being located either in the portion (of the lens) "toward the document" (portion denoted by numeral 111) or the portion (of the lens) "toward the linear image sensor" (portion denoted by numeral 112). The direction away from the document and toward the linear image sensor will be defined as "downward" and the opposite direction as "upward".

In the simulation, one rod lens including an optically discontinuous portion with a certain interface is provided right in the middle of the array of the rod lens array 31 described above. The 5 micrometer by 5 micrometer square pixel of the linear image sensor located immediately beneath the optical axis of the rod lens 30 including the optically discontinuous portion is caused to emit pseudo light. In the absence of the lens including the optically discontinuous portion, or in the case of light rays not affected by optically discontinuous portions, the light rays are condensed in a region (referred to as light condensation region F) near an intersection f between the optical axis Ax of the lens and the top surface 131 of the original platen glass 13 as indicated by a light ray 41 denoted by the broken line. Meanwhile, if a rod lens having an optically discontinuous portion in its interior or on its surface is included, an interface 411 included in the optically discontinuous portion induces reflecting or refracting light outside the design. Some light rays are emitted from the rod lens 30, reflected by the top surface 131 or a bottom surface 132 of the original platen glass 13, before reaching an irradiation surface 141 of the linear light source 14, as indicated by light rays 42 and 43 denoted by the two-dot chain lines.

For measurement of the impact from the optically discontinuous portion, the intensity $I_1$ of a portion of the light rays from pseudo light emission refracted or reflected by the interface 411 of the optically discontinuous portion and reaching the irradiation surface 141 of the linear light source 14 as indicated by the light ray 42 or 43 is calculated, the intensity $I_0$ of light rays from light emission traveling on a light path as designed without being affected by the interface 411 and reaching the light condensation region F on the document G as indicated by the light ray 41 is calculated, and the ratio $I_1/I_0$ of the former light intensity to the latter light intensity (light intensity ratio in the presence of the optically discontinuous portion; hereinafter, referred to as light intensity ratio) is calculated. It should be noted that the light rays 41, 42, and 43 shown in FIG. 5 are examples of light rays reaching a target region and, in reality, a large number of light beams reach the respective target regions via similar light paths.

In light of the principle of regressivity of light, the above result showing that the pseudo light ray emitted from the linear image sensor 15 reaches the irradiation surface 141 of the linear light source 14 under the impact from the optically discontinuous portion in the simulation, is mirrored in an optical system including an actual image sensor by a portion of the illumination light emitted from the irradiation surface 141 of the linear light source 14 being reflected or refracted contrary to the design by the optically discontinuous portion included in the rod lens 30 and reaching the linear image sensor 15.

The light does not contribute to imaging of the document G on the linear image sensor 15, which is the action of the optical system as designed, but is considered to provide an impact such as reduced contrast due to a flare or white streaks in the resultant image.

Figure 6:
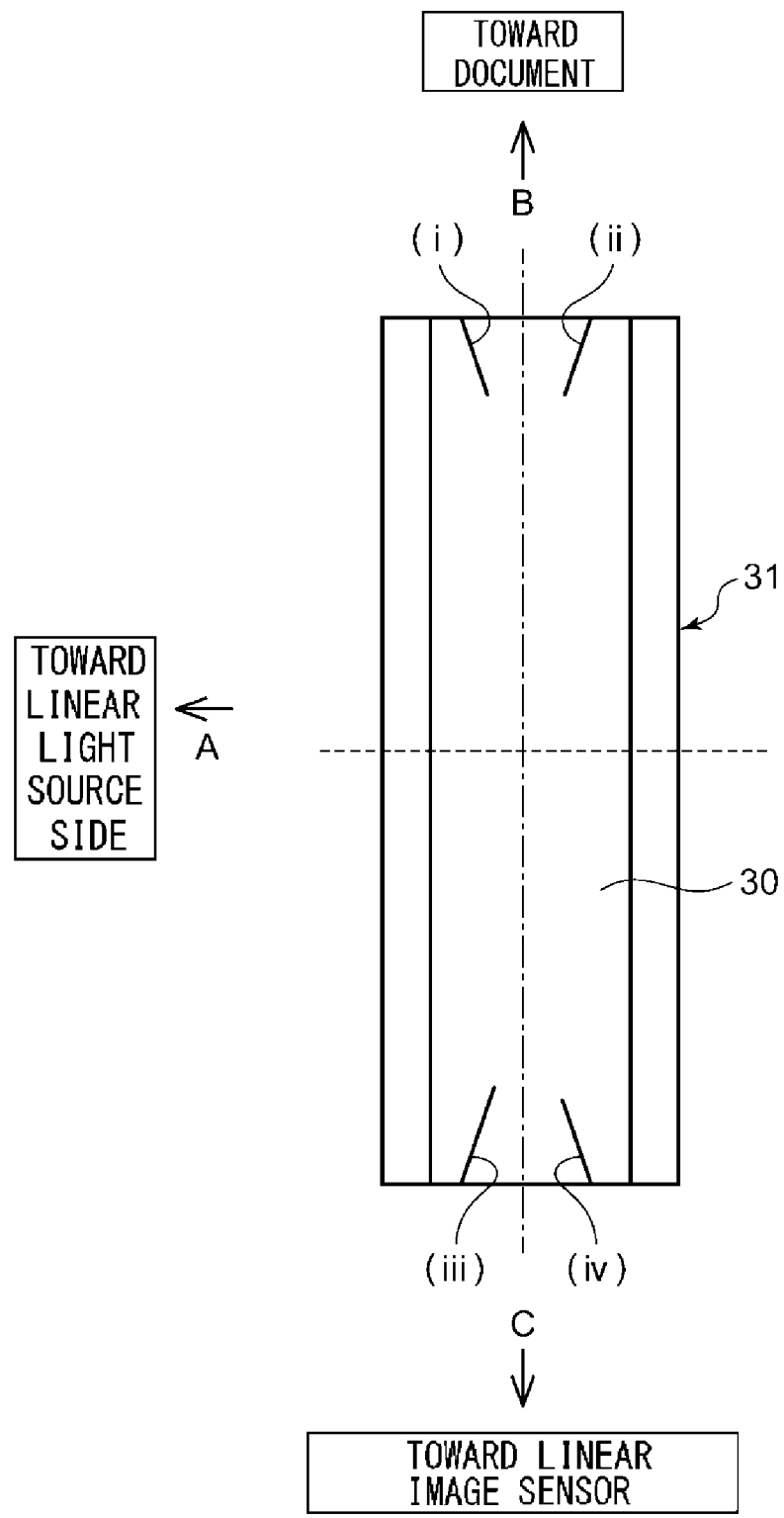
FIG. 6 is a schematic sectional view showing the position and direction of the interface of an optically discontinuous portion included in a rod lens used in the simulation.
Figure 7:
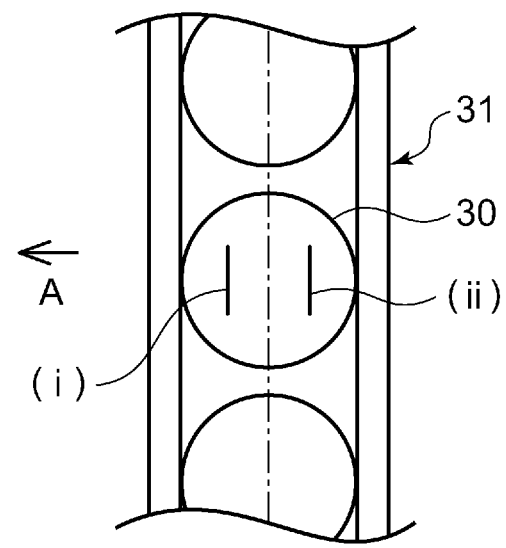
FIG. 7 is a schematic plan view of the rod lens used in the simulation viewed from the document side, showing the positions and directions of interfaces belonging to (i) and (ii)
Figure 8:
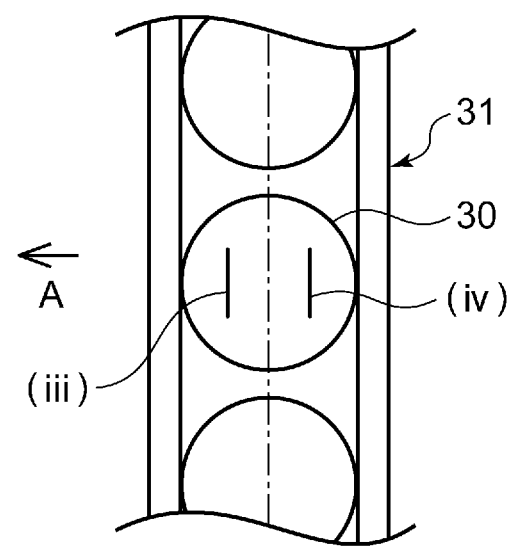
FIG. 8 is a schematic plan view of the rod lens used in the simulation viewed from the linear image sensor side, showing the positions and directions of interfaces belonging to (iii) and (iv)

The interface included in the optically discontinuous portion in the rod lens is assumed to be located at positions and in orientations as shown in (i)~(iv) of FIG. 6. FIG. 6 is a side view revealed by cutting the rod lens 30 that includes an interface of an optically discontinuous portion by a plane including the interface and parallel to the optical axis, when it is assumed that the rod lens 30 is oriented such that the direction indicated by an arrow A in the figure is toward the linear light source, the direction indicated by an arrow B in the figure is toward the document, and the direction indicated by an arrow C in the figure is toward the linear image sensor. FIG. 7 is a plan view of the end face of the rod lens as viewed from the side of the document, and FIG. 8 is a plan view of the end face of the rod lens as viewed from the side of the linear image sensor. The position and direction of (i) indicate that the optically discontinuous portion having that interface is located toward the document and the direction of the interface extending from the end face of the rod lens 30 facing the document is downward and is oriented away from the linear light source. The position and direction of (ii) indicate that the optically discontinuous portion having that interface is located toward the document and the direction of the interface extending from the end face of the rod lens 30 facing the document is downward and is oriented toward the linear light source. The position and direction of (iii) indicate that the optically discontinuous portion having that interface is located toward the linear image sensor and the direction of the interface extending from the end face of the rod lens 30 facing the linear image sensor is upward and is oriented away from the linear light source. The position and direction of (iv) indicate that the optically discontinuous portion having that interface is located toward the linear image sensor and the direction of the interface extending from the end face of the rod lens 30 facing the linear image sensor is upward and is oriented toward the linear light source. The interfaces described above are planar. As shown in FIG. 7, the interfaces belonging to (i) and (ii) or lines of intersection between planes extending from the interfaces and the end face of the rod lens facing the document are perpendicular to the direction indicated by the arrow A in the figure. As shown in FIG. 8, the interfaces belonging to (iii) and (iv) or lines of intersection between planes extending from the interfaces and the end face of the rod lens facing the linear image sensor are perpendicular to the direction indicated by the arrow A in the figure. For example, the interface of the optically discontinuous portion shown in FIG. 5 has the attribute of (i).

Figure 9:
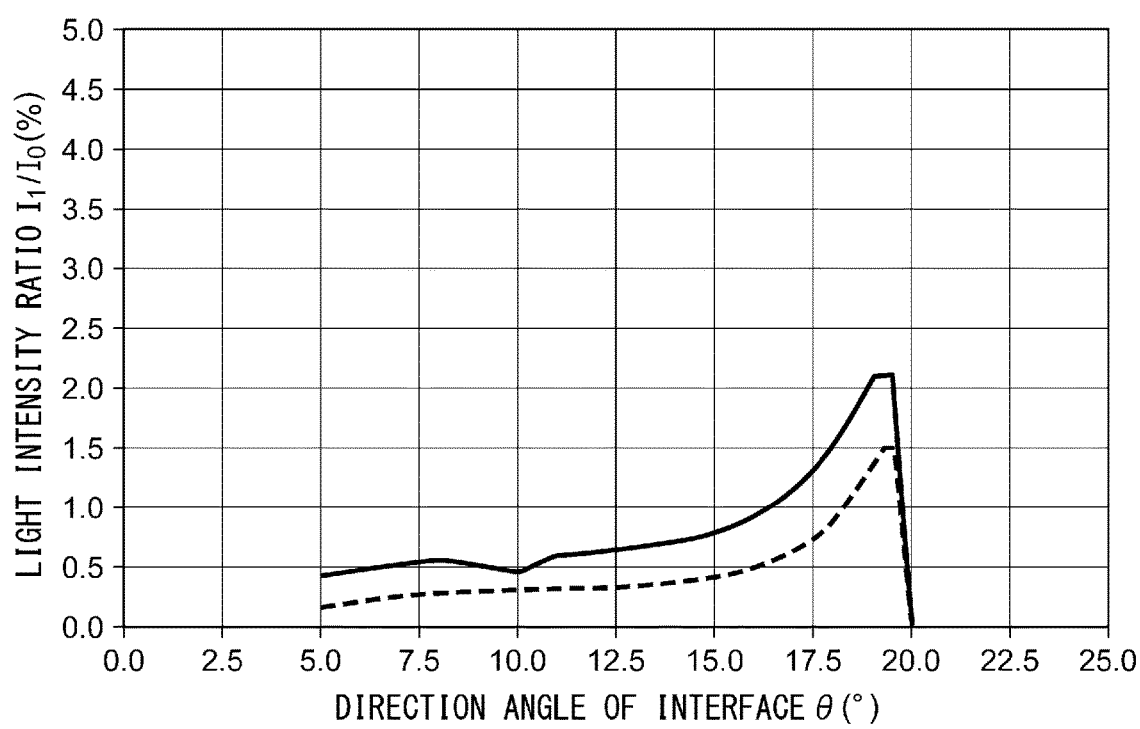
FIG. 9 is a graph showing how the light intensity ratio varies as the direction angle θ of the interface varies.
Figure 10A:
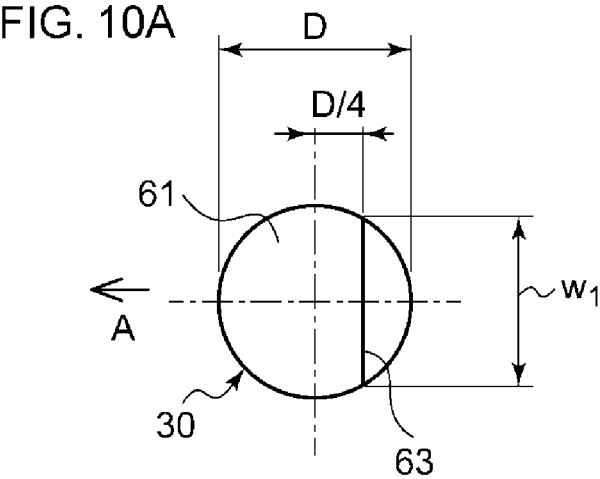
FIGS. 10A-10C show a rod lens used as a model to perform the simulation of FIG. 9.
Figure 10B:
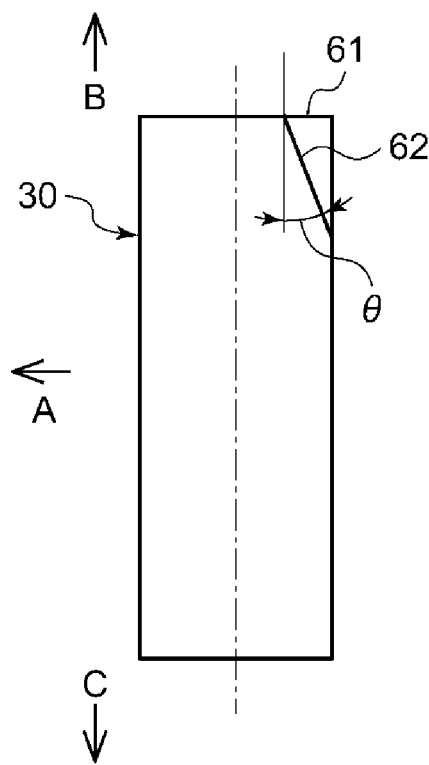
Figure 10C:
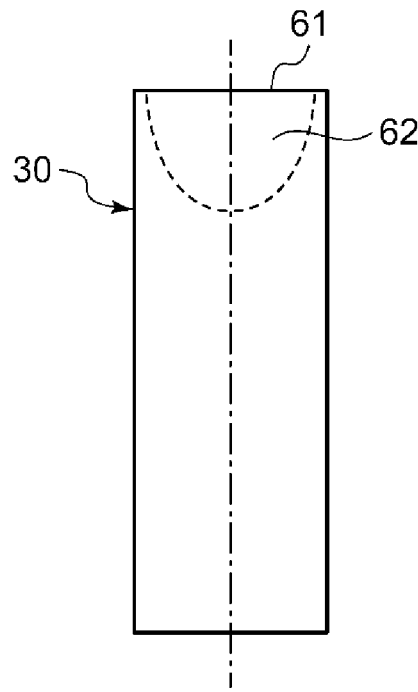

FIG. 9 is a graph calculated based on a simulation to see how the light intensity ratio varies as the direction angle of the planar interface defined by the position and direction of (i) is changed. The direction angle is an angle formed by the interface and the optical axis. FIGS. 10A-10C show an interface of an optically discontinuous portion used in the simulation. FIG. 10A shows an end face of the rod lens 30, FIG. 10B shows a cross section of the rod lens 30, and FIG. 10C shows a side face of the rod lens 30. The rod lens array 31 is installed in the configuration shown in FIG. 5 to orient the rod lens 30 including an optically discontinuous portion having an interface 62 as shown in FIGS. 10A-10C such that the direction indicated by the arrow A in the figure is toward the linear light source, the direction indicated by the arrow B in the figure is toward the document, and the direction indicated by the arrow C is toward the linear image sensor.

As shown in FIG. 10A, a line of intersection 63 between the interface 62 and an end face 61 facing the document is perpendicular to the direction indicated by the arrow A in the figure indicating a direction toward the linear light source. Denoting the effective diameter of the rod lens 30 by D, the line of intersection 63 is located at a distance of D/4 from the center of the rod lens 30. The width $w_1$ of the line of intersection 63 is a length extending from end to end of the effective region of the end face 61 of the rod lens 30 facing the document and is such that $w_1$=0.242 mm. The interface 62 extends from the line of intersection 63 through the interior and reaches the side surface of the rod lens 30.

The horizontal axis of FIG. 9 represents the direction angle $\theta(°)$ of the interface 62, and the vertical axis represents the light intensity ratio $I_1/I_0$ (%). The solid line indicates the light intensity ratio $I_1/I_0$, where $I_1$ is defined as a sum of the intensity of a light reflected by the top surface 131 of the original platen glass 13 and reaching the irradiation surface 141 of the linear light source 14 and the intensity of a light reflected by the bottom surface 132 of the original platen glass 13 and reaching the irradiation surface 141 of the linear light source 14. The broken line indicates the light intensity ratio $I_1/I_0$, where $I_1$ is defined as the intensity of a light reflected by the bottom surface 132 of the original platen glass 13 and reaching the irradiation surface 141 of the linear light source 14.

As shown in FIG. 9, the light intensity ratio reaches 0 when the direction angle of the interface 62 is 20° or greater. This means that some light rays are reflected by the interface but are not emitted outside the rod lens 30 or, even if they are emitted, do not reach the irradiation surface 141 of the linear light source 14.

Since the light intensity ratio determined by totaling the reflection from the top surface and the bottom surface is required to be 0.5% or lower, and, preferably, 0.1% or lower, FIG. 9 reveals that the direction angle of the interface of less than 20° presents a problem.

Figure 11:
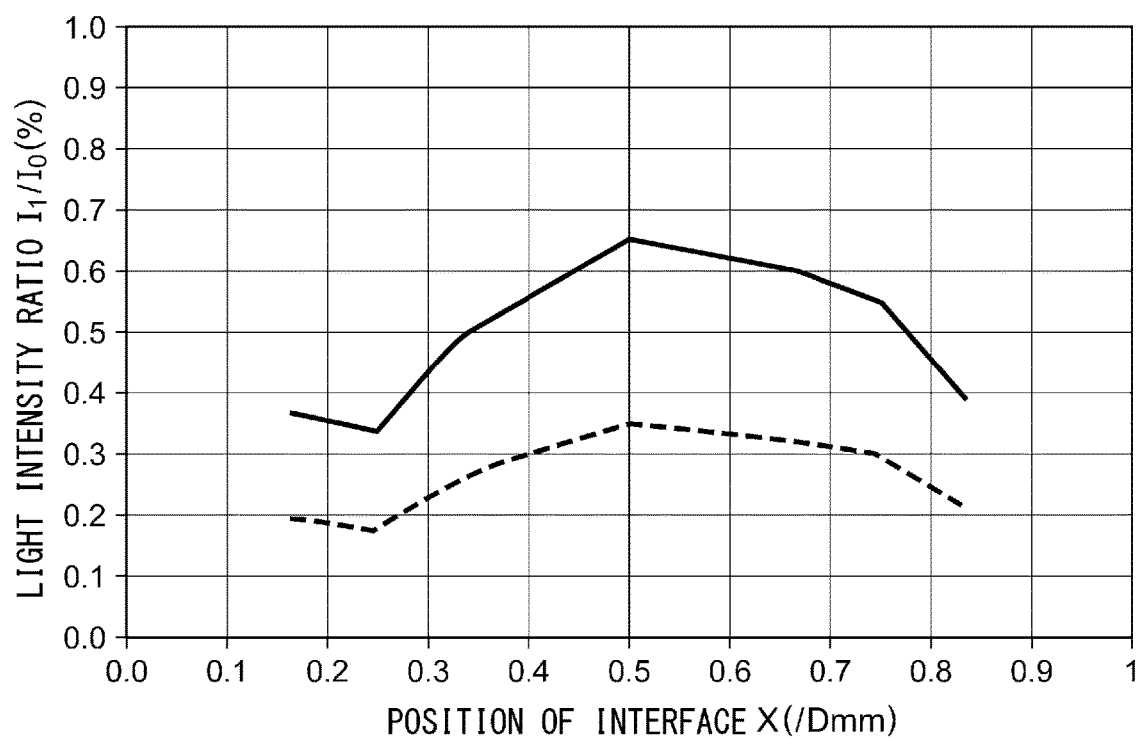
FIG. 11 is a graph showing how the light intensity ratio varies as the position X of the interface varies.
Figure 12A:
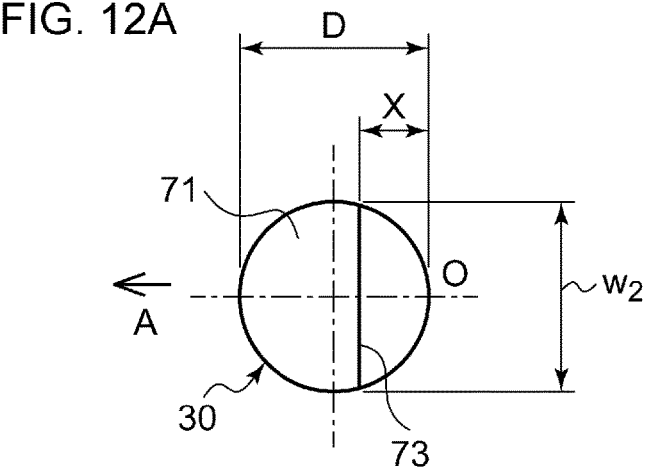
FIGS. 12A-12C show a rod lens used as a model to perform the simulation of FIG. 11.
Figure 12B:
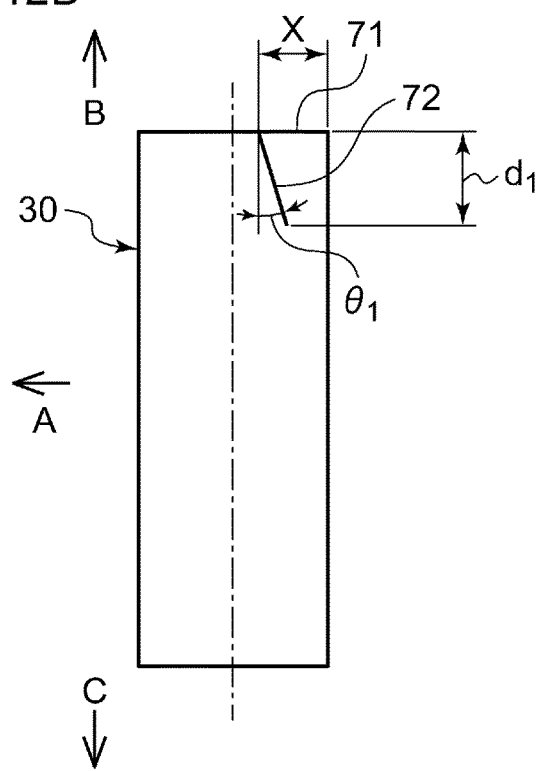
Figure 12C:
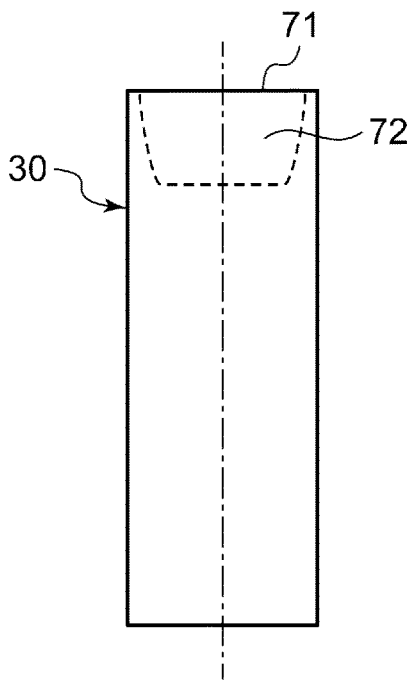

FIG. 11 is a graph calculated based on a simulation to see how the light intensity ratio varies as the position of the planar interface defined by the position and direction of (i) in the diametrical direction of the rod lens 30 is changed. FIGS. 12A-12C show an interface 72 of an optically discontinuous portion used in the simulation. FIG. 12A shows an end face of the rod lens 30, FIG. 12B shows a cross section of the rod lens 30, and FIG. 12C shows a side face of the rod lens 30. The rod lens array 31 is installed in the configuration shown in FIG. 5 to orient the rod lens 30 including an optically discontinuous portion having the interface 72 as shown in FIGS. 12A-12C such that the direction indicated by the arrow A in the figure is toward the linear light source, the direction indicated by the arrow B in the figure is toward the document, and the direction indicated by the arrow C is toward the linear image sensor.

As shown in FIGS. 12A-12C, a line of intersection 73 between the interface 72 and an end face 71 facing the document is perpendicular to the direction indicated by the arrow A in the figure indicating a direction toward the linear light source. The width $w_2$ of the line of intersection 73 is a length extending from end to end of the effective region of the end face 71 of the rod lens 30 facing the document. The depth $d_1$ of the interface 72 from the end face 71 facing the document is assumed to be 0.1 mm and the direction angle $\theta_1$ is assumed to be 15°. The position X indicates a distance from a point 0 on the end face 71 facing the document farthest from the linear light source.

The horizontal axis of FIG. 11 represents the position X (mm) of the interface on the lens end face with reference to the effective diameter D of the rod lens 30. The vertical axis represents the light intensity ratio $I_1/I_0$ (%). The solid line indicates the light intensity ratio $I_1/I_0$, where $I_1$ is defined as a sum of the intensity of a light reflected by the top surface 131 of the original platen glass 13 and reaching the irradiation surface 141 of the linear light source 14 and the intensity of a light reflected by the bottom surface 132 of the original platen glass 13 and reaching the irradiation surface

141 of the linear light source 14. The broken line indicates the light intensity ratio $I_1/I_0$, where $I_1$ is defined as the intensity of a light reflected by the bottom surface 132 of the original platen glass 13 and reaching the irradiation surface 141 of the linear light source 14.

Since the light intensity ratio determined by totaling the reflection from the top surface and the bottom surface is required to be 0.5% or lower, and, preferably, 0.1% or lower, FIG. 11 reveals that the position of the interface in the range of 0.35D~0.75D particularly presents a problem.

Figure 13:
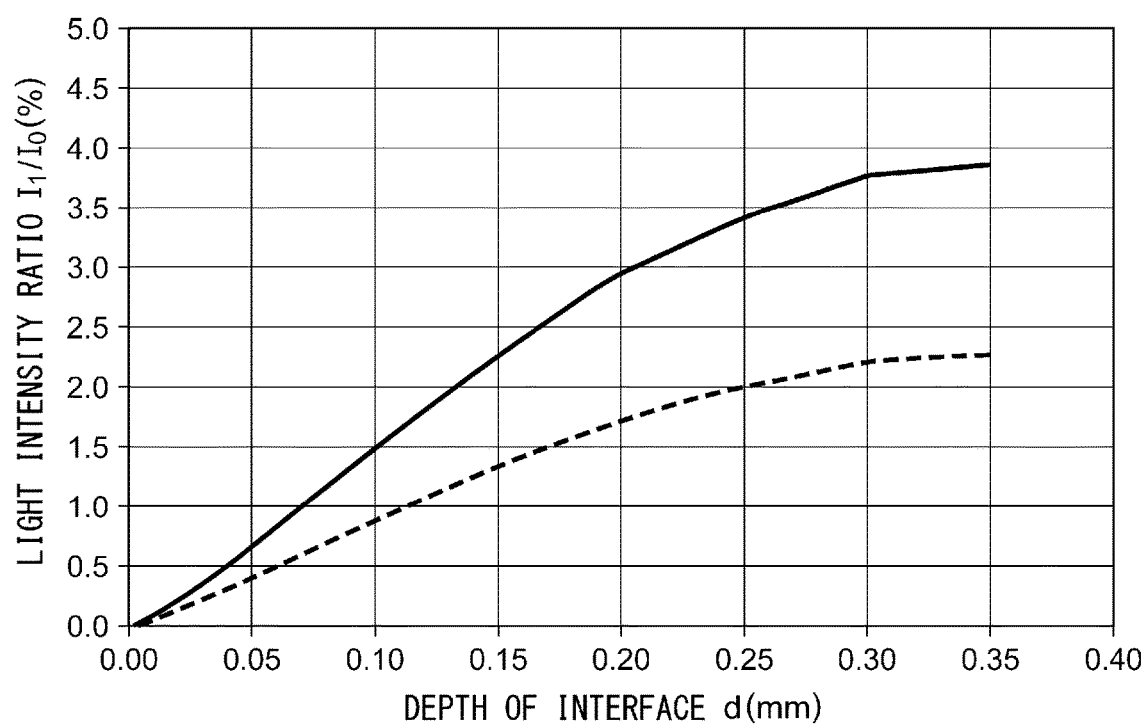
FIG. 13 is a graph showing how the light intensity ratio varies as the depth d of the interface varies.
Figure 14A:
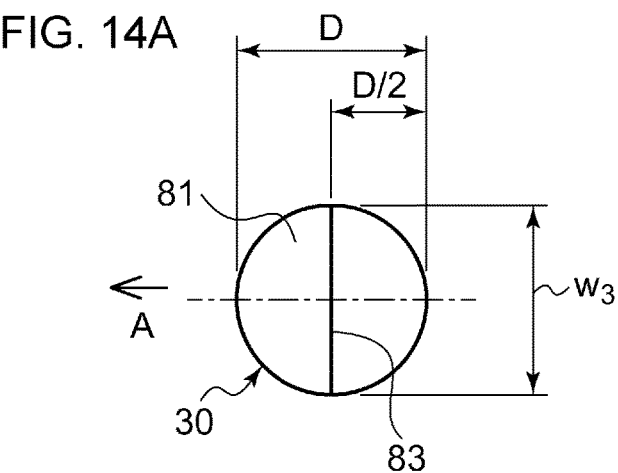
FIGS. 14A-14C show a rod lens used as a model to perform the simulation of FIG. 13.
Figure 14B:
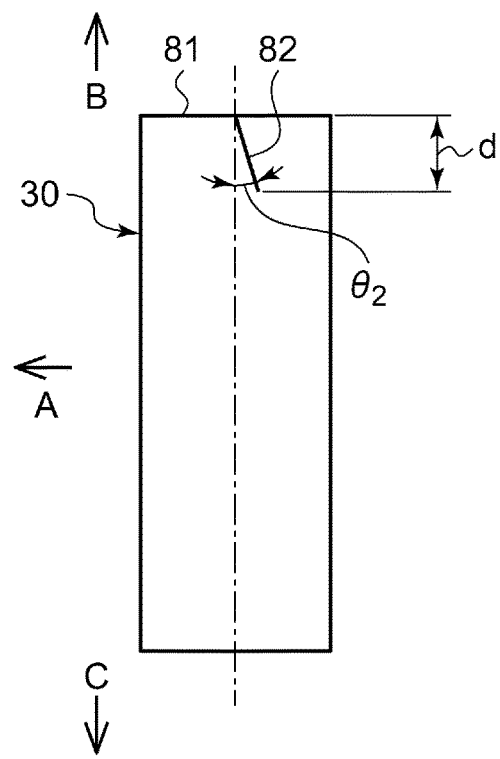
Figure 14C:
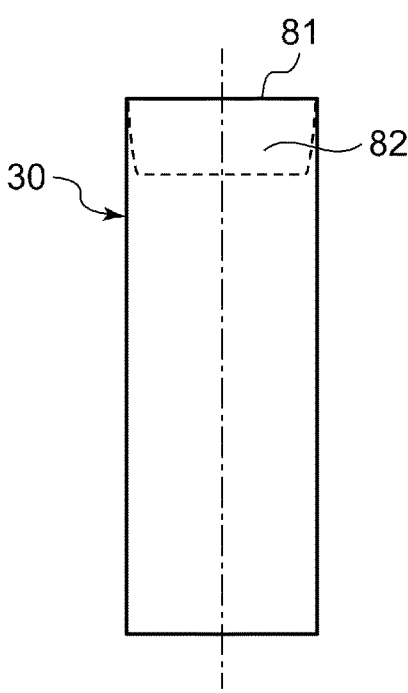

FIG. 13 is a graph calculated based on a simulation to see how the light intensity ratio varies as the depth d of the planar interface defined by the position and direction of (i) from the end face of the rod lens 30 facing the document is changed. FIGS. 14A-14C show an interface 82 of an optically discontinuous portion used in the simulation. FIG. 14A shows an end face of the rod lens 30, FIG. 14B shows a cross section of the rod lens 30, and FIG. 14C shows a side face of the rod lens 30. The rod lens array 31 is installed in the configuration shown in FIG. 5 to orient the rod lens 30 including an optically discontinuous portion having the interface 82 as shown in FIGS. 14A-14C such that the direction indicated by the arrow A in the figure is toward the linear light source, the direction indicated by the arrow B in the figure is toward the document, and the direction indicated by the arrow C is toward the linear image sensor.

As shown in FIGS. 14A-14C, a line of intersection 83 between the interface 82 and an end face 81 facing the document is perpendicular to the direction indicated by the arrow A in the figure indicating a direction toward the linear light source. Since the line of intersection 83 passes through the center of the rod lens 30, the width $w_3$ of the line of intersection 83 is equal to the effective diameter D of the rod lens 30 and is such that $w_3=0.28$ mm. The direction angle $\theta_2$ of the interface 82 is assumed to be 18°.

The horizontal axis of FIG. 13 represents the depth d (mm) of the interface, and the vertical axis represents the light intensity ratio $I_1/I_0$ (%). The solid line indicates the light intensity ratio $I_1/I_0$, where $I_1$ is defined as a sum of the intensity of a light reflected by the top surface 131 of the original platen glass 13 and reaching the irradiation surface 141 of the linear light source 14 and the intensity of a light reflected by the bottom surface 132 of the original platen glass 13 and reaching the irradiation surface 141 of the linear light source 14. The broken line indicates the light intensity ratio $I_1/I_0$, where $I_1$ is defined as the intensity of a light reflected by the bottom surface 132 of the original platen glass 13 and reaching the irradiation surface 141 of the linear light source 14.

Since the light intensity ratio determined by totaling the reflection from the top surface and the bottom surface is required to be 0.5% or lower, and, preferably, 0.1% or lower, FIG. 13 reveals that the depth of the interface of 0.01 mm or greater, and, in particular, 0.03 mm or greater, presents a problem.

Figure 15:
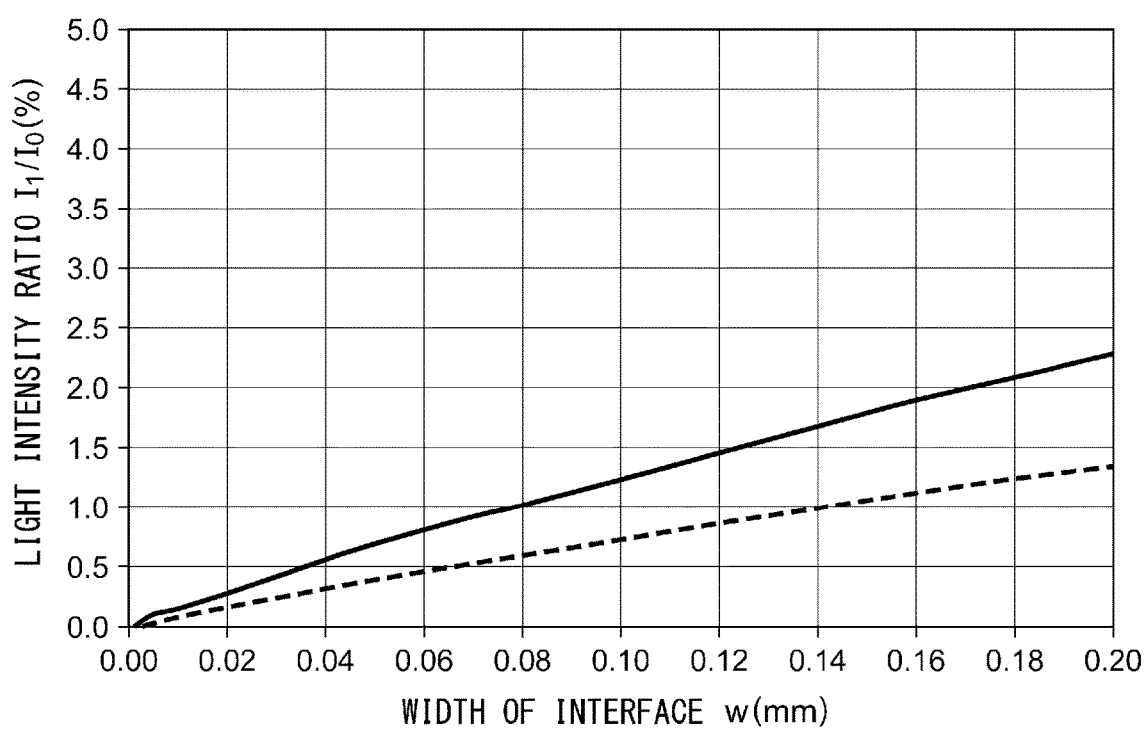
FIG. 15 is a graph showing how the light intensity ratio varies as the width w of the interface varies.
Figure 16A:
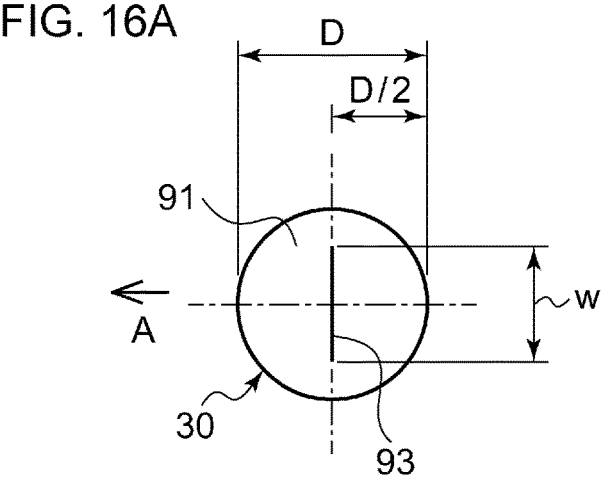
FIGS. 16A-16C show a rod lens used as a model to perform the simulation of FIG. 15.
Figure 16B:
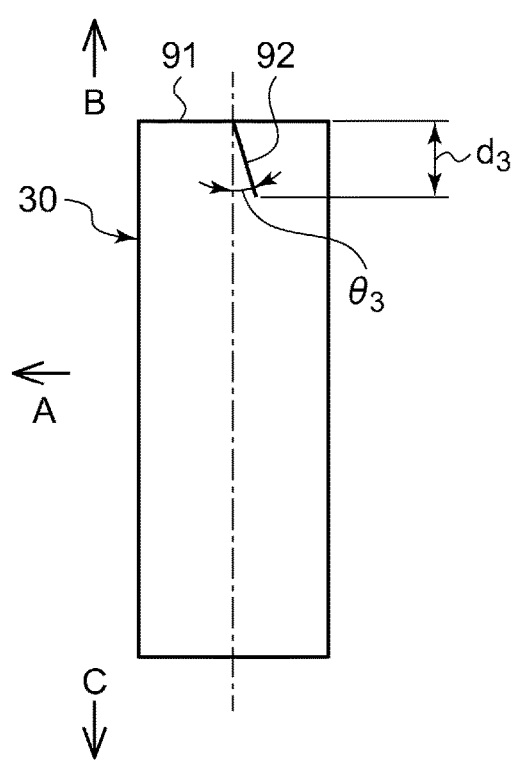
Figure 16C:
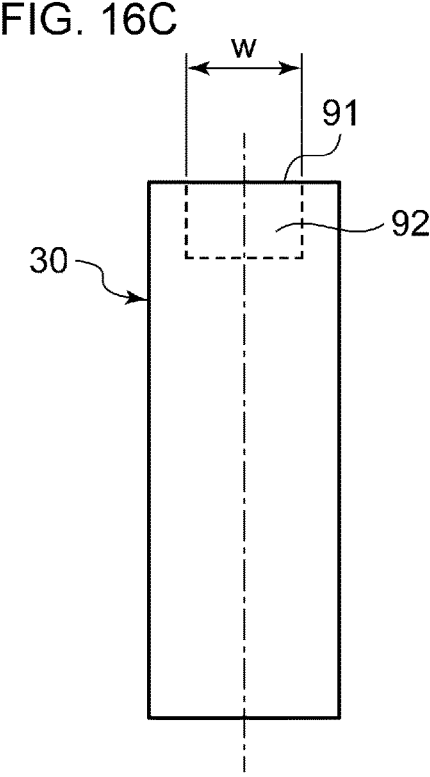

FIG. 15 is a graph calculated based on a simulation to see how the light intensity ratio varies as the width w of the line of intersection between the planar interface defined by the position and direction of (i) and the end face of the rod lens facing the document is changed. FIGS. 16A-16C show an interface of an optically discontinuous portion used in the simulation. FIG. 16A shows an end face of the rod lens 30, FIG. 16B shows a cross section of the rod lens 30, and FIG. 16C shows a side face of the rod lens 30. The rod lens array 31 is installed in the configuration shown in FIG. 5 to orient the rod lens 30 including an optically discontinuous portion having the interface 92 as shown in FIGS. 16A-16C such that the direction indicated by the arrow A in the figure is toward the linear light source, the direction indicated by the arrow B in the figure is toward the document, and the direction indicated by the arrow C is toward the linear image sensor.

As shown in FIGS. 16A-16C, a line of intersection 93 between the interface 92 and an end face 91 facing the document is perpendicular to the direction indicated by the arrow A in the figure indicating a direction toward the linear light source, and the center of the rod lens bisects the line of intersection 93. The depth $d_3$ of the interface 92 from the end face 91 toward the document is assumed to be 0.2 mm and the direction angle $\theta_3$ is assumed to be 18°.

The horizontal axis of FIG. 15 represents the width w (mm) of the interface 92, and the vertical axis represents the light intensity ratio $I_1/I_0$ (%). The solid line indicates the light intensity ratio $I_1/I_0$, where $I_1$ is defined as a sum of the intensity of a light reflected by the top surface 131 of the original platen glass 13 and reaching the irradiation surface 141 of the linear light source 14 and the intensity of a light reflected by the bottom surface 132 of the original platen glass 13 and reaching the irradiation surface 141 of the linear light source 14. The broken line indicates the light intensity ratio $I_1/I_0$, where $I_1$ is defined as the intensity of a light reflected by the bottom surface 132 of the original platen glass 13 and reaching the irradiation surface 141 of the linear light source 14.

Since the light intensity ratio determined by totaling the reflection from the top surface and the bottom surface is required to be 0.5% or lower, and, preferably, 0.1% or lower, FIG. 15 reveals that the width of the interface of 0.01 mm or greater, and, in particular, 0.04 mm or greater, presents a problem.

Meanwhile, simulations were conducted in consideration of a model similar to the one described above, in which the interface is located in the position and direction of (ii)~(iv) in FIG. 6, and the direction angle of the interface, the position of the interface, the depth of the interface, and the width of the interface are varied. Light rays passing through a light path outside the design due to reflection or refraction at the interface are found but none are identified as reaching the irradiation surface 141 of the linear light source 14.

Figure 17:
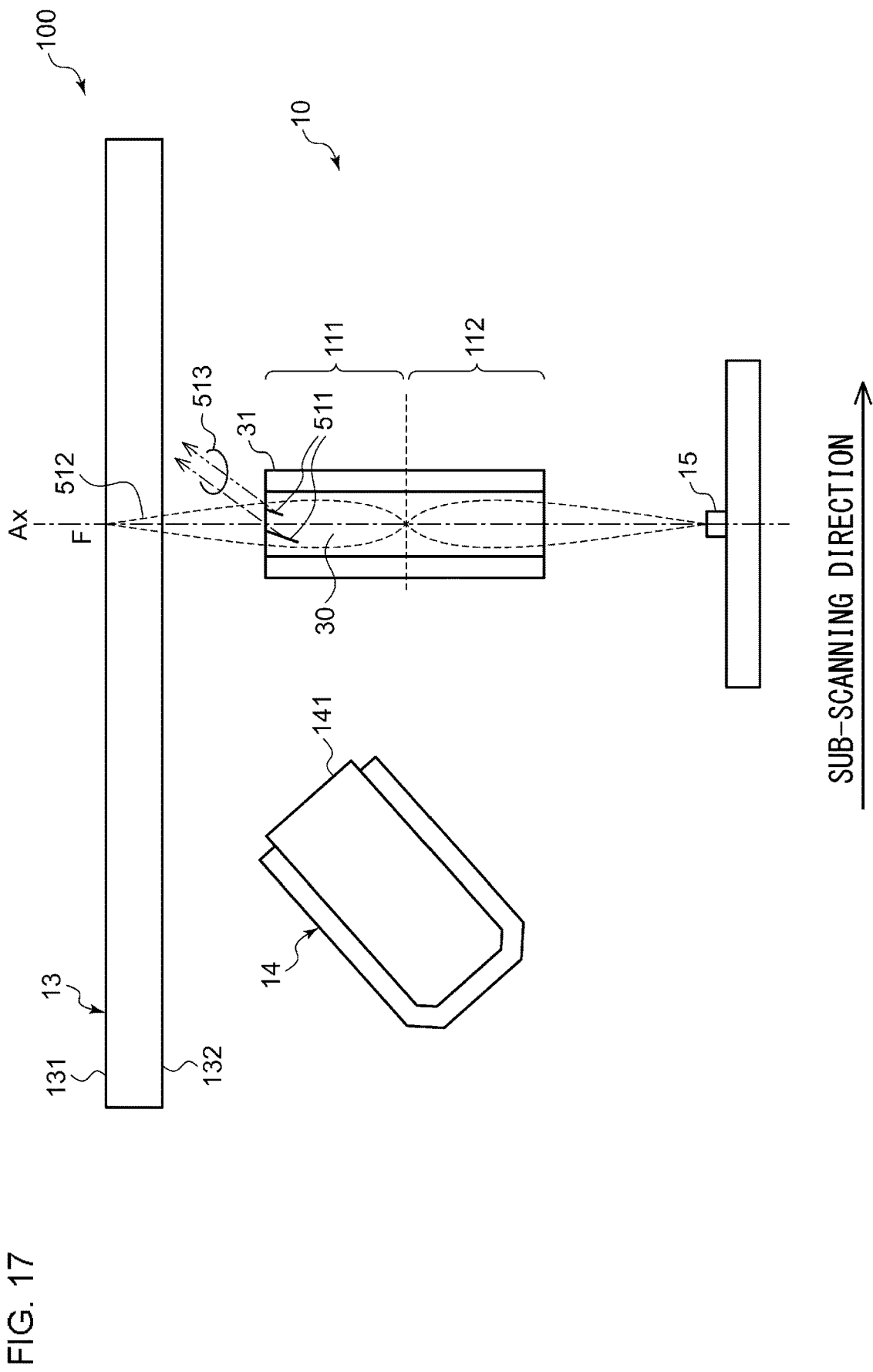
FIG. 17 is a schematic sectional view showing light paths of light rays in a rod lens array including an interface of an optically discontinuous portion belonging to (ii) shown in FIG. 6.

FIG. 17 shows how light rays are reflected or refracted by an interface 511 having the attribute of (ii) in FIG. 6. Referring to FIG. 17, a reflecting light 513 from the interface 511 is emitted from the rod lens 30 but travels in a direction opposite to the direction toward the linear light source. Therefore, there are hardly any light rays that reach the irradiation surface 141. The air layer at the interface assumed to be located in the optically discontinuous portion is extremely thin. Therefore, refraction at the interface 511 hardly affects the light path and no light rays are produced that travel toward the irradiation surface 141 of the linear light source 14.

Figure 18:
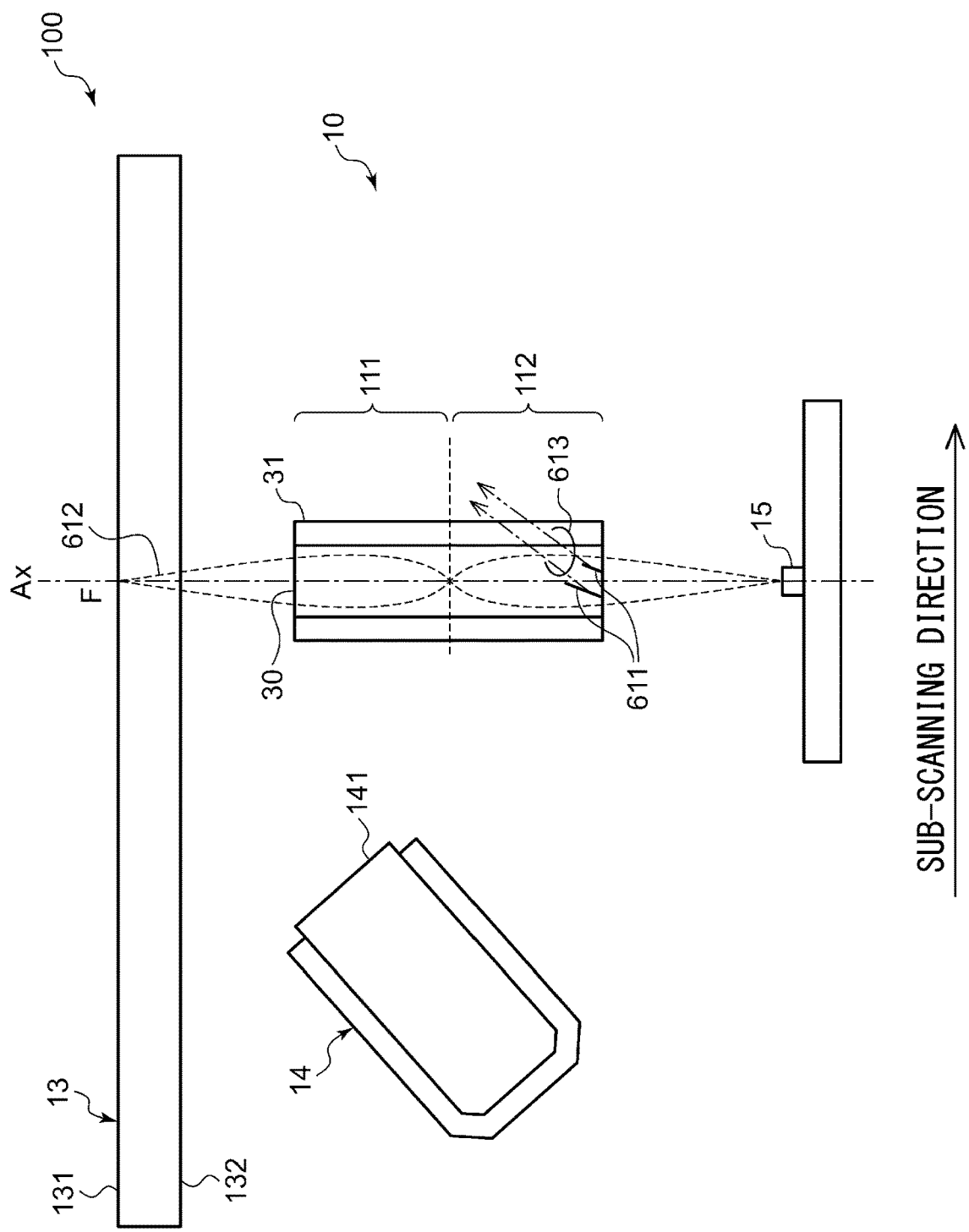
FIG. 18 is a schematic sectional view showing light paths of light rays in a rod lens array including an interface of an optically discontinuous portion belonging to (iii) shown in FIG. 6.

FIG. 18 shows how light rays are reflected or refracted by an interface 611 having the attribute of (iii) in FIG. 6. Referring to FIG. 18, a reflecting light 613 from the interface 611 travels toward the side surface of the rod lens 30. As described above, the side surfaces of the rod lens 30 are cladded or coated for light absorption and are designed not to propagate light rays deviated from the light path as designed. Therefore, the reflecting light 613 is rapidly attenuated so that there are hardly any light rays emitted from the rod lens 30. Meanwhile, refraction at the interface 611 hardly affects the light path as described above. Therefore, no light rays traveling to the irradiation surface 141 of the linear light source 14 are produced from the light refracted by the interface 611. Further, even if the light path is affected by refraction, the refracted light is attenuated by being absorbed at the side surface of the rod lens before reaching the end face facing the document and is hardly emitted from the rod lens 30.

Figure 19:
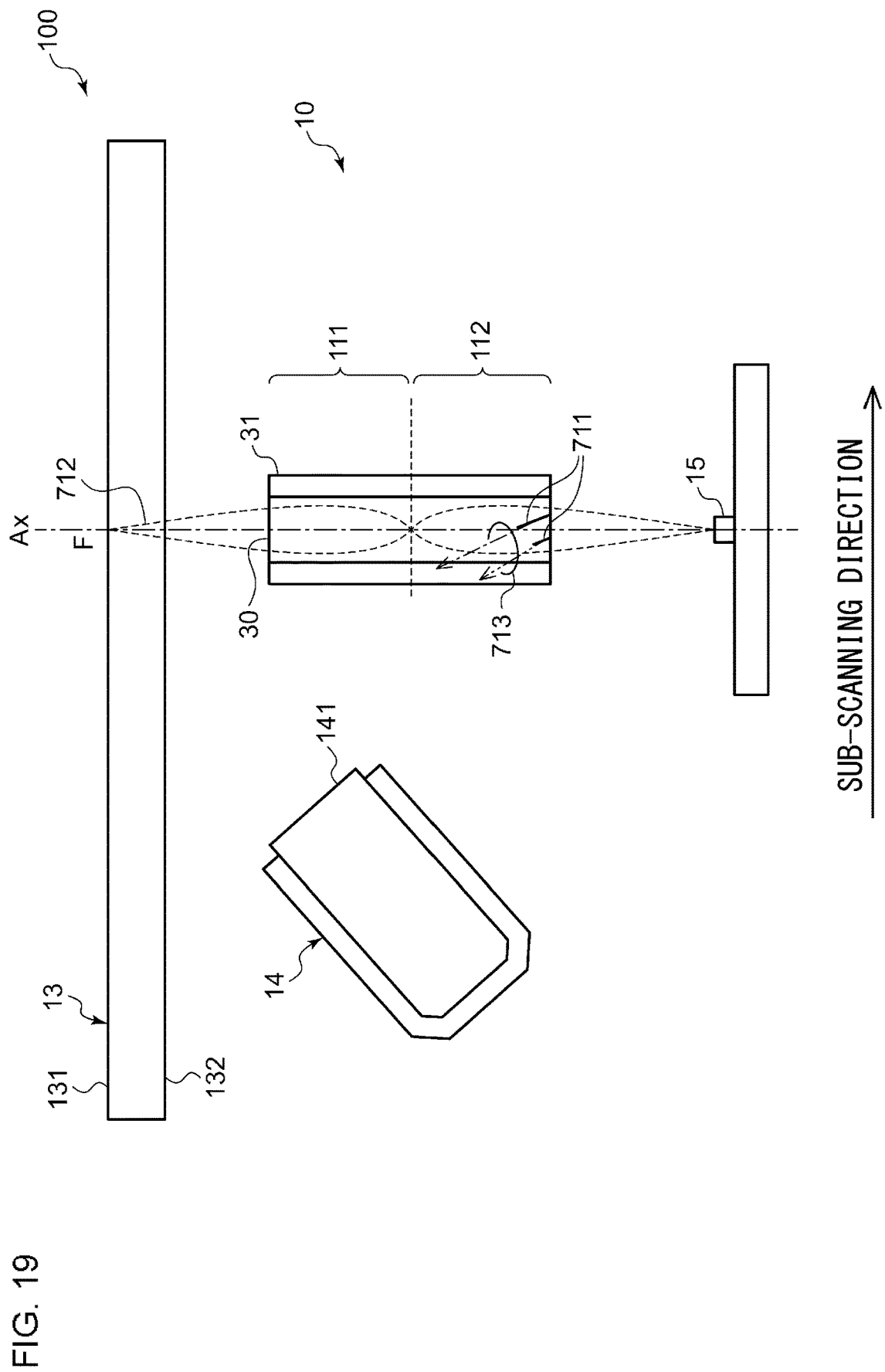
FIG. 19 is a schematic sectional view showing light paths of light rays in a rod lens array including an interface of an optically discontinuous portion belonging to (iv) shown in FIG. 6.

FIG. 19 shows how light rays are reflected or refracted by an interface 711 having the attribute of (iv) in FIG. 6. Referring to FIG. 19, a reflecting light 713 from the interface 711 travels toward the side surface of the rod lens 30 and so is rapidly attenuated as described above in connection with (iii) so that there are hardly any light rays emitted from the rod lens 30. Further, as is true of the situation regarding (iii) discussed above, there are hardly any light rays of the light refracted at the interface 711 that are emitted from the rod lens 30.

Based on the foregoing, the likelihood that the light reflected or refracted by any interface belonging to the position and direction of (ii)~(iv) in FIG. 6 and located in the rod lens 30 reaches the irradiation surface 141 of the linear light source 14 is extremely small.

The study above indicates that adverse impact on an obtained image such as a flaw like a flare and white streaks is inhibited by at least configuring the image sensor unit such that an interface having an optically discontinuous portion is not located in the position and direction of (1).

A study will now be made to see what kind of optically discontinuous portion has the attribute of position and direction of (i).

Figure 20:
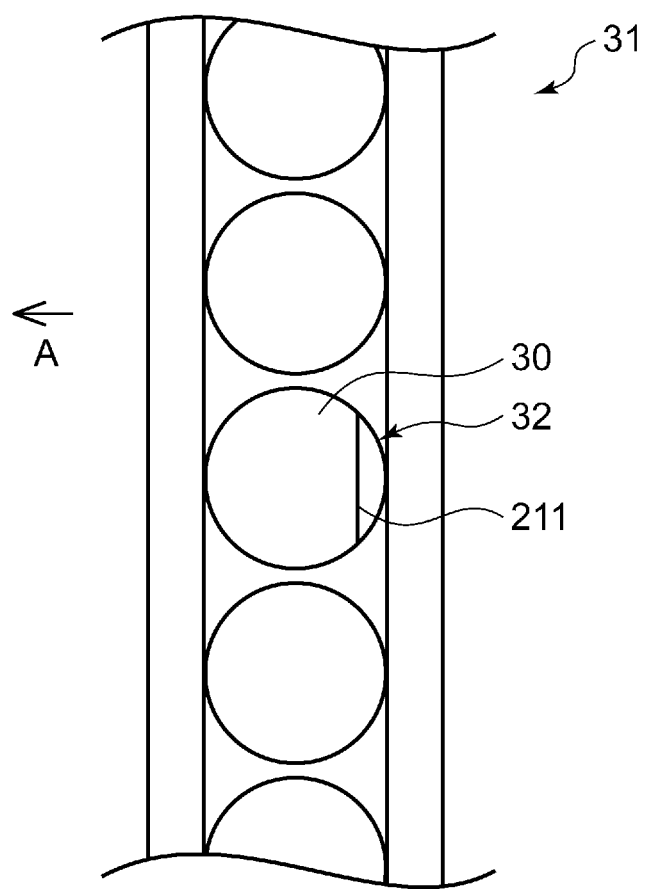
FIG. 20 shows an embodiment in which a chip is located at a certain position in a rod lens.
Figure 21:
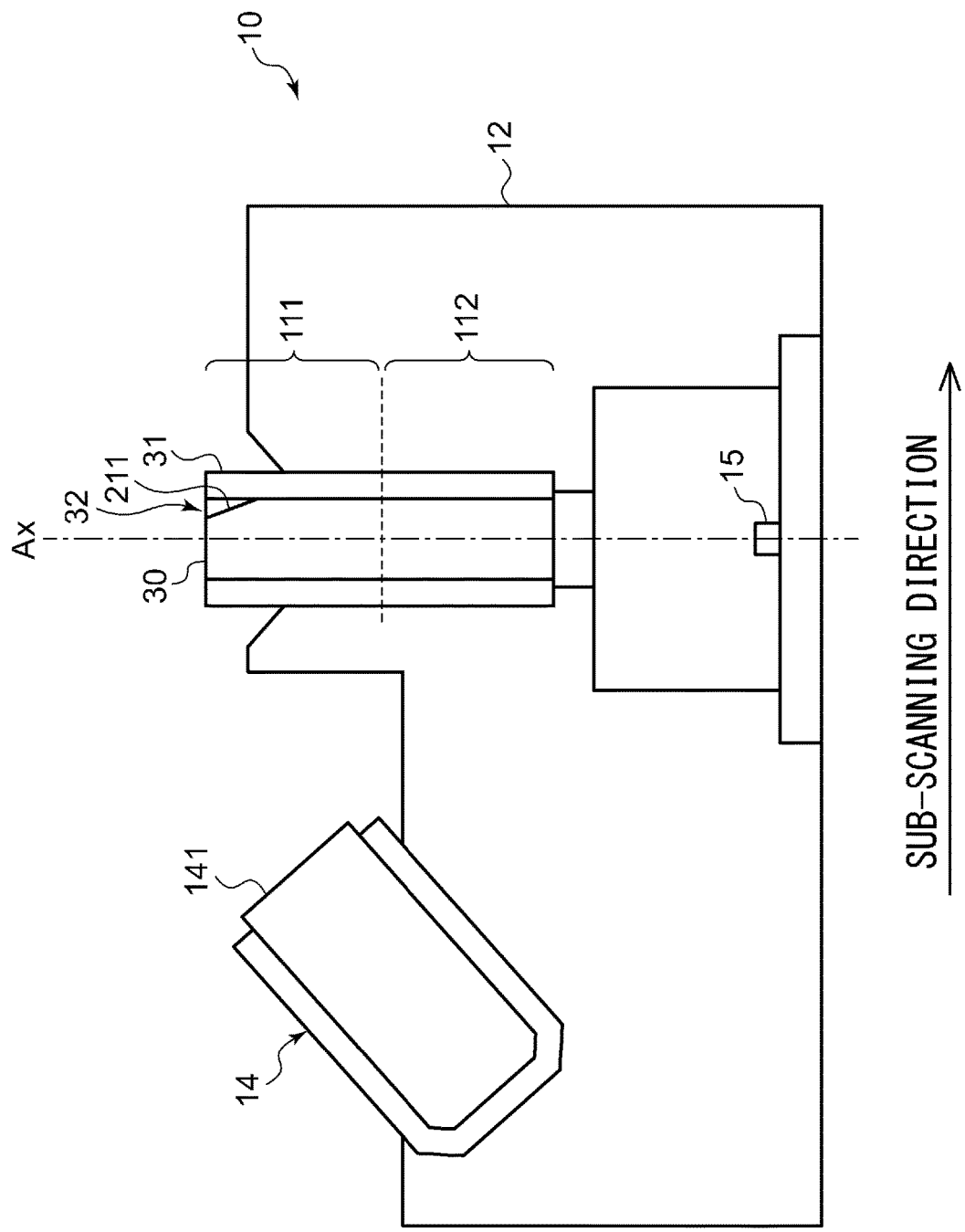
FIG. 21 is a schematic sectional view showing an embodiment in which a chip is at a certain position in a rod lens.

For example, a consideration is given of a case in which an image sensor unit is configured such that the rod lens 30 having an optically discontinuous portion in the form of the chip 32 as shown in FIGS. 2A and 2B is located toward the document 111 as shown in FIGS. 20 and 21. FIG. 20 shows a portion of the lens array of the image sensor unit having the chip 32 as viewed in a direction from the original platen glass, and an arrow A in the figure indicates the direction toward the linear light source. A line of intersection between an interface 211 and the end face of the rod lens 30 facing the document is perpendicular to the direction indicated by the arrow A in the figure. FIG. 21 shows a cross section of the image sensor unit revealed by cutting the image sensor unit by a plane perpendicular to the main scanning direction. The interface 211 of the chip 32 belongs to (i) in terms of the location and direction. It is therefore suggested that the interface 211 may affect the optical performance adversely.

Figure 22:
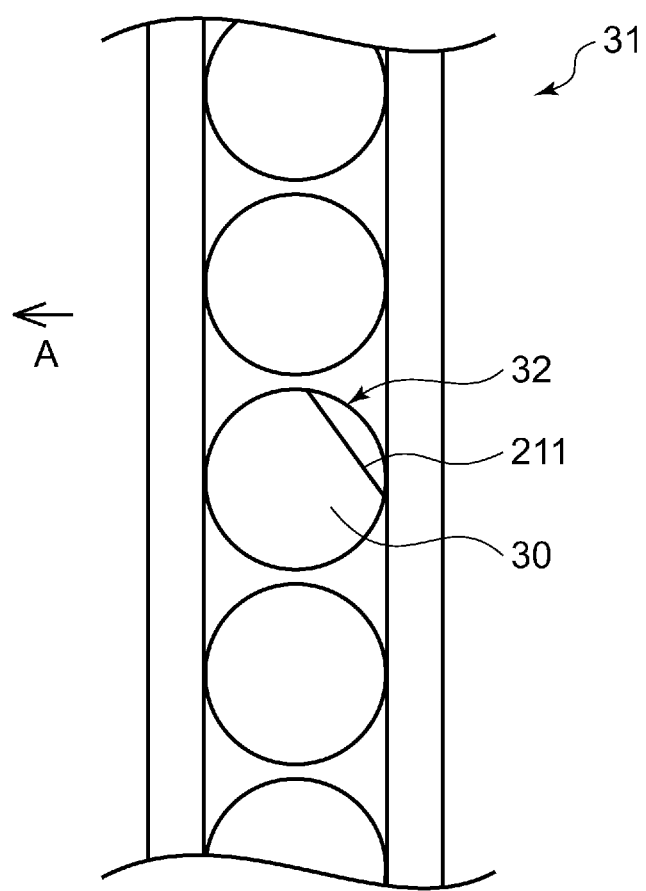
FIG. 22 shows another embodiment in which a chip is located at a certain position in a rod lens.
Figure 23:
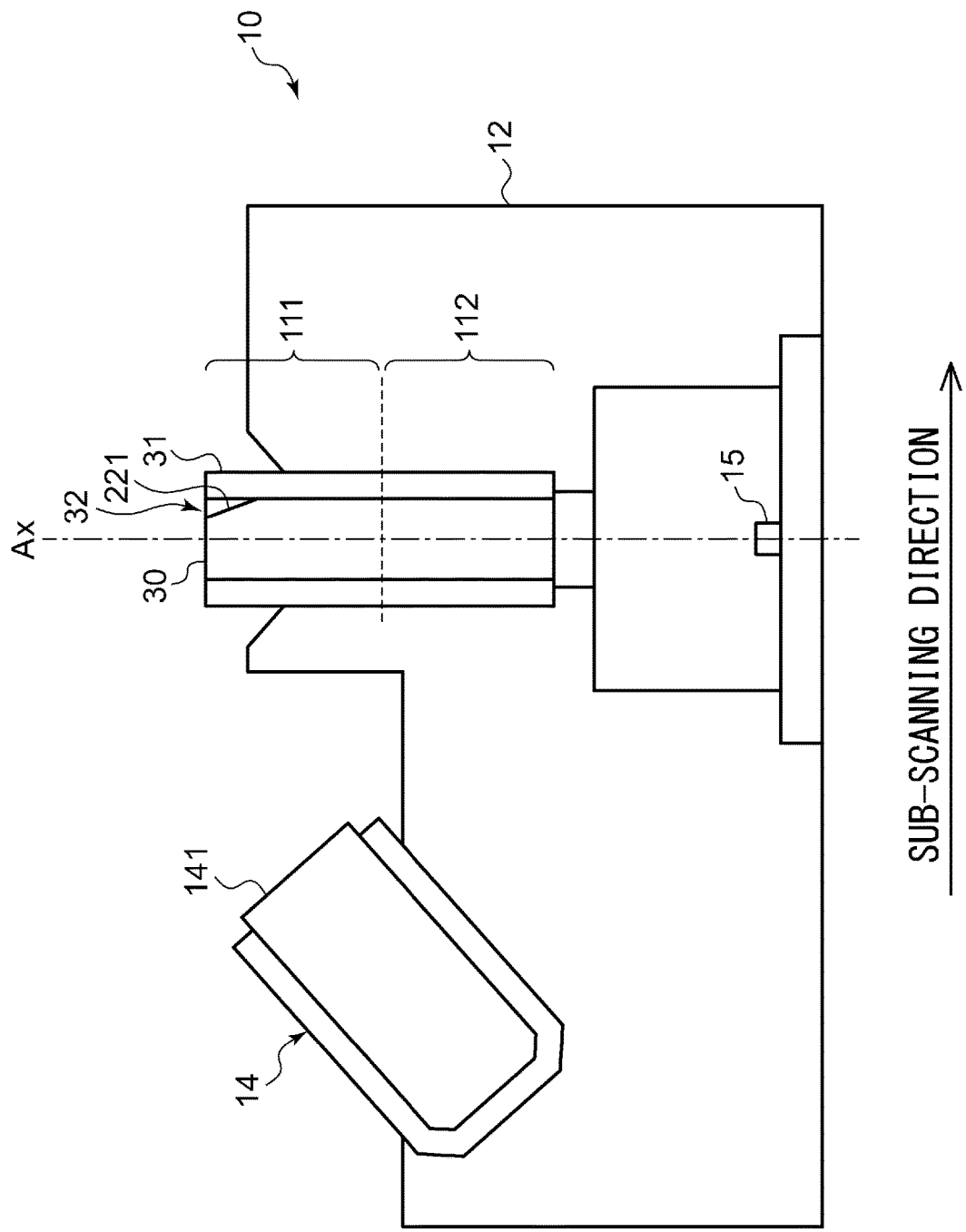
FIG. 23 is a schematic sectional view showing another embodiment in which a chip is at a certain position in a rod lens.

A consideration is further given of a case in which an image sensor unit is configured such that the rod lens 30 having the chip 32 as shown in FIGS. 2A and 2B is located toward the document 111 as shown in FIGS. 22 and 23. FIG. 22 shows a portion of the lens array of the image sensor unit having the chip 32 as viewed in a direction from the original platen glass, and an arrow A in the figure indicates the direction toward the linear light source. By decomposing a line of intersection between an interface 221 and the end face of the rod lens 30 facing the document into the direction indicated by the arrow A in the figure and a direction perpendicular thereto, the interface would have a component perpendicular to the direction indicated by the arrow A in the figure. FIG. 23 shows a cross section of the image sensor unit revealed by cutting the image sensor unit by a plane perpendicular to the main scanning direction. The perpendicular component of the interface 221 of the chip 32 belongs to (i) in terms of the location and direction. It is therefore suggested that the interface 221 may affect the optical performance adversely.

Figure 24:
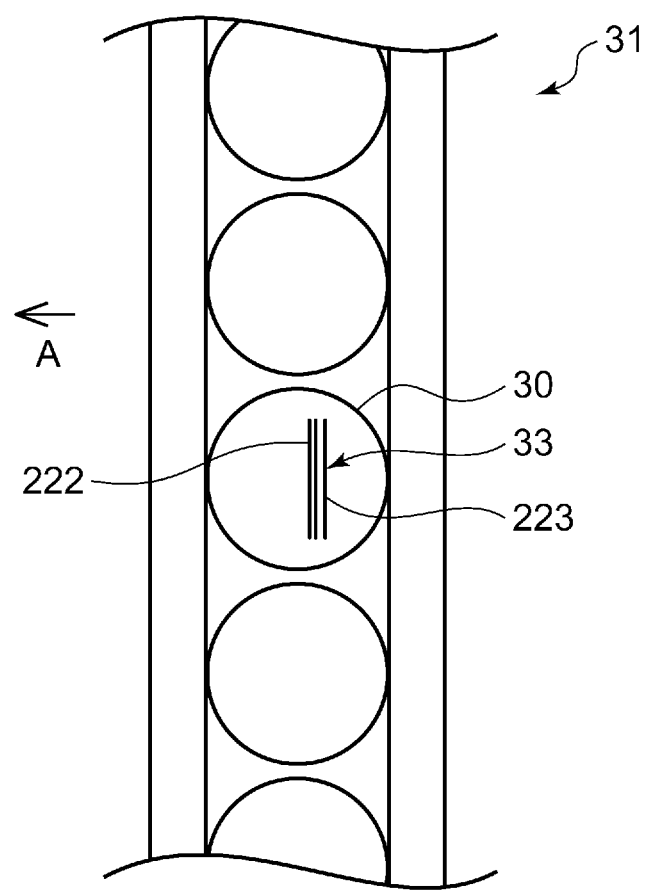
FIG. 24 shows an embodiment in which a scratch is located at a certain position in a rod lens.
Figure 25:
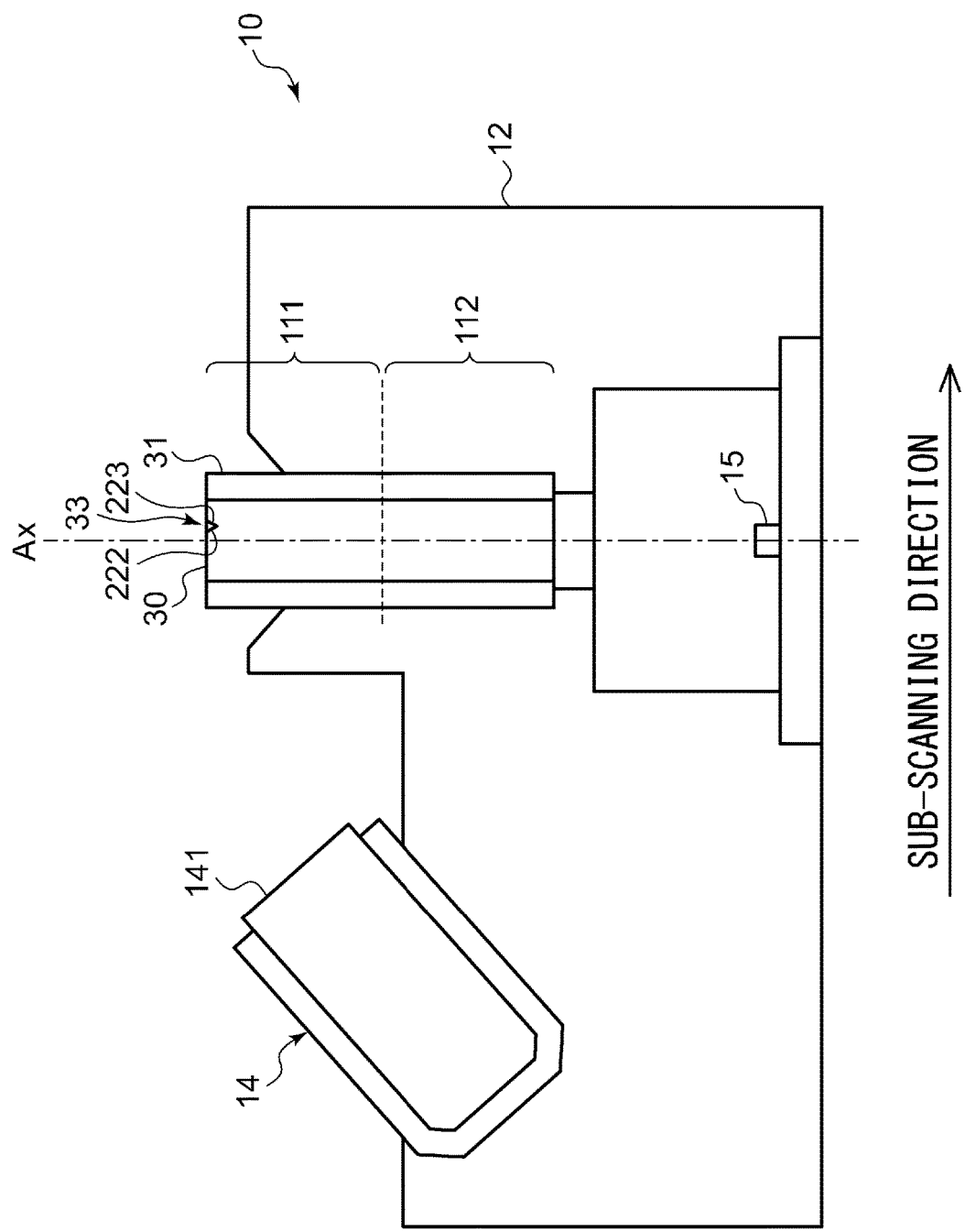
FIG. 25 is a schematic sectional view showing an embodiment in which a scratch is at a certain position in a rod lens.

A consideration is next given of a case in which an image sensor unit 10 is configured such that the rod lens 30 having an optically discontinuous portion in the form of the scratch 33 as shown in FIGS. 3A and 3B is located toward the document 111 as shown in FIGS. 24 and 25. FIG. 24 shows a portion of the lens array of the image sensor unit having the scratch 33 as viewed in a direction from the original platen glass, and an arrow A in the figure indicates the direction toward the linear light source. A line of intersection between an interface 222 and the end face of the rod lens 30 facing the document is perpendicular to the direction indicated by the arrow A in the figure. FIG. 25 shows a cross section of the image sensor revealed by cutting the image sensor unit by a plane perpendicular to the main scanning direction. The interface 222 of the scratch 33 belongs to (i) in FIG. 6 in terms of the location and direction. It is therefore suggested that the interface 222 may affect the optical performance adversely.

Meanwhile, an intersection between an interface 223 and the end face of the rod lens 30 facing the document is perpendicular to the direction indicated by the arrow A in the figure but the interface 223 belongs to (ii) in FIG. 6 in terms of the direction and orientation. It is therefore suggested that the likelihood that the interface 223 affects the optical performance adversely is small.

Figure 26:
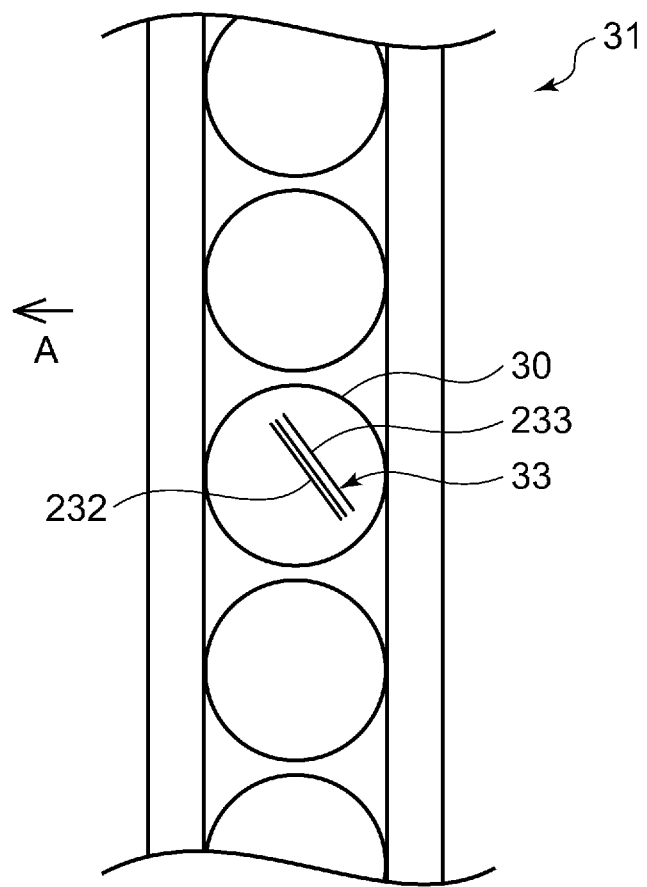
FIG. 26 shows another embodiment in which a scratch is located at a certain position in a rod lens.
Figure 27:
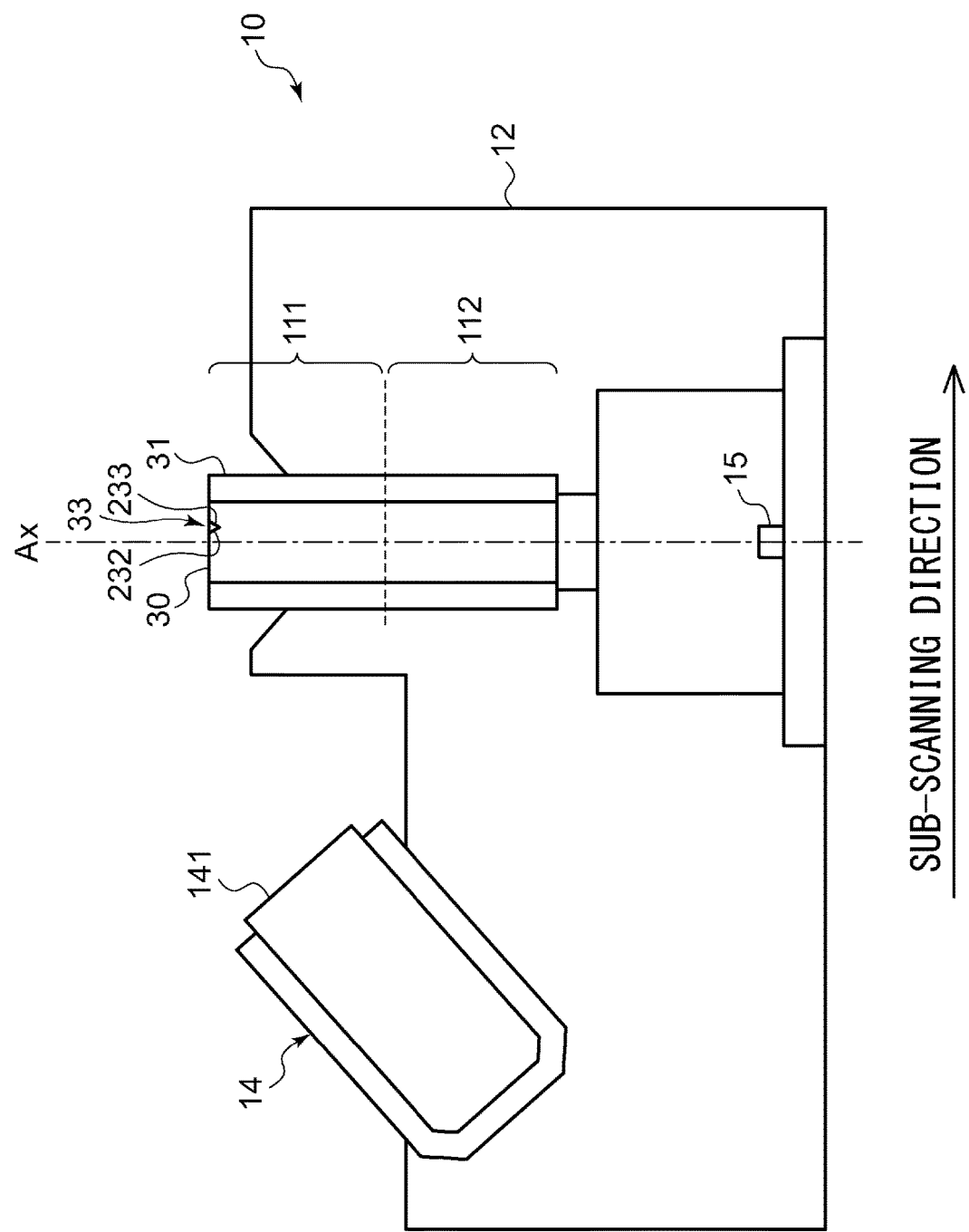
FIG. 27 is a schematic sectional view showing another embodiment in which a scratch is at a certain position in a rod lens.

A consideration is further given of a case in which an image sensor unit 10 is configured such that the rod lens 30 having the scratch 33 as shown in FIGS. 3A and 3B is located toward the document 111 as shown in FIGS. 26 and 27. FIG. 26 shows a portion of the lens array of the image sensor unit 10 having the scratch 33 as viewed in a direction from the original platen glass, and an arrow A in the figure indicates the direction toward the linear light source. By decomposing a line of intersection between an interface 232 and the end face of the rod lens 30 facing the document into the direction indicated by the arrow A in the figure and a direction perpendicular thereto, the interface would have a component perpendicular to the direction indicated by the arrow A in the figure. FIG. 27 shows a cross section of the image sensor unit revealed by cutting the image sensor unit by a plane perpendicular to the main scanning direction. The perpendicular component of the interface 232 of the scratch 33 belongs to (i) in terms of the location and direction. It is therefore suggested that the interface 232 may affect the optical performance adversely.

Meanwhile, by decomposing a line of intersection between an interface 233 and the end face of the rod lens 30 facing the document into the direction indicated by the arrow A in the figure and a direction perpendicular thereto, the interface 233 would have a component perpendicular to the direction indicated by the arrow A in the figure. However, the perpendicular component of the interface belongs to (ii) in FIG. 6 in terms of the direction and orientation. It is therefore suggested that the likelihood that the interface 233 affects the optical performance adversely is small.

Accordingly, it is suggested that, where an optically discontinuous portion having one or a plurality of interfaces such as the chip 32 and the scratch 33 is located near the end face of the rod lens 30 facing the document, the interface may impact the optical performance, which may result in reduced contrast due to a flare or occurrence of white streaks in images obtained in the image sensor unit 10 or the image reading device 100 provided with such a structure, provided that a line of intersection between the interface (or a plane extending therefrom) and the end face of the rod lens 30 toward the document has a component perpendicular to the direction toward the linear light source.

However, when an optically discontinuous portion having one or a plurality of interfaces such as the chip 32 and the scratch 33 is located near the end face of the rod lens 30 facing the document, it is difficult to arrange the rod lens 30 such that a line of intersection between the interface (or a plane extending therefrom) and the end face of the rod lens 30 facing the document does not have a component perpendicular to the direction toward the linear light source. Accordingly, the rod lens 30 having an optically discontinuous portion on the surface and/or interior of the erecting equal-magnification lens array 11 is included in the image sensor unit 10 manufactured, the erecting equal-magnification lens array 11 is arranged such that the optically discontinuous portion is not located toward the document. In essence, the erecting equal-magnification lens array 11 is arranged in such a case that the optically discontinuous portion is located toward the linear image sensor 15. This prevents reduced contrast due to a flare or occurrence of white streaks so that the optical performance is prevented from being degraded.

By employing the manufacturing method described above, the image sensor unit 10 or the image reading device 100 can be manufactured without degrading the optical performance even if the erecting equal-magnification lens array 11 includes an optically discontinuous portion in the form of a crack, chip, scratch, etc. Therefore, the erecting equal-magnification lens array 11 and the image sensor unit 10 that were hitherto disposed of as rejected products due to the defect can be regenerated or saved. As a result, the yield is improved and the manufacturing cost is reduced.

Described above is an explanation based on an exemplary embodiment. The embodiment is intended to be illustrative only and it will be understood by those skilled in the art that various modifications to constituting elements and processes could be developed and that such modifications are also within the scope of the present invention.

The embodiment was described above as using an SLA, a rod lens array including a plurality of rod lenses with a graded index inside arranged in the main scanning direction, is used as the erecting equal-magnification lens array. However, the substance of the invention remains unchanged if a resin rod lens array including an array of a large number of graded index rod lenses is used as the erecting equal-magnification lens array. The same is true of using a lens array plate (or a stack thereof) produced by arranging a large number of convex lenses on one or both surfaces of a transparent dielectric substrate such as a plastic along the main scanning direction, as an erecting equal-magnification lens array.

The description of the embodiment and the simulation was directed to an erecting equal-magnification lens array including rod lenses arranged in a single line in the main scanning direction, but the erecting equal-magnification lens array including two or more lines of lenses are not outside the scope of the present invention.

What is claimed is:

1. An image sensor for scanning a work along a sub-scanning direction, the image sensor comprising:
    a linear light source having an irradiation surface for emitting a light, configured to illuminate the work along a main-scanning direction perpendicular to the sub-scanning direction;
    a linear image sensor including a plurality of photoelectric transducers; and
    an erecting equal-magnification lens array configured to condense a light reflected from the work, the erecting equal-magnification lens array including a plurality of single lenses arranged in the main-scanning direction, each single lens having a light input face facing the work and a light output face facing the linear image sensor, the light input face receiving the light reflected from the work, the output face emitting the light to the linear image sensor,
    wherein the linear light source is provided adjacent to the erecting equal-magnification lens array in the sub scanning direction,
    wherein the erecting equal-magnification lens array includes a single lens having a chip and/or scratch with an interface inside the lens, the single lens has the chip and/or scratch selected from the group consisting of at least one of following conditions (i), (ii), (iii) and (iv):
    (i) the chip and/or scratch located on the light input surface of the single lens, and the interface extending from the light input surface toward the light output surface, orienting away from the linear light source, selected from the group consisting of at least one of following conditions (a), (b), (c) and (d):
        (a) 20 degree or more of a direction angle of the interface θ;
        (b) $0<X<0.35\,D$ or $0.75\,D<X<D$ of a position X of the interface in the sub scanning direction of the interface, the X measured from the opposite edge on the linear light source side, where D is an effective diameter of the single lens;
        (c) less than 0.03 mm of a depth of the interface, the depth measured from the light input surface;
        (d) less than 0.04 mm of a length of the interface in the main scanning direction;
    (ii) the chip and/or scratch located on the light output surface of the single lens, and the interface extending from the light output surface toward the light input surface, orienting away from the linear light source; and
    (iii) the chip and/or scratch located on the light output surface of the single lens, and the interface extending from the light output surface toward the light input surface, orienting toward the linear light source,
    (iv) the chip and/or scratch located on the light input surface of the single lens, and the interface extending from the light input surface toward the light output surface, orienting toward the linear light source.

2. The image sensor according to claim 1, wherein the linear light source has a light emitting surface arranged to face the work and configured to illuminate the work.

3. The image sensor according to claim 1, wherein the erecting equal-magnification lens array is a rod lens array including a plurality of rod lens.

4. A method of manufacturing an image sensor for scanning a work along a sub-scanning direction, the method comprising:
    installing a linear light source in a housing configured to illuminate the work along a main-scanning direction perpendicular to the sub-scanning direction, the housing including a linear sensor provided in the main-scanning direction; and
    installing an erecting equal-magnification lens array in the housing, the erecting equal-magnification lens array configured to be adjacent to the linear light source in the sub scanning direction, and condense a light reflected from the work, the erecting equal-magnification lens array including a plurality of single lenses arranged in the main-scanning direction, each single lens having a light input face facing the work and a light output face facing the linear image sensor, the light input face receiving the light reflected from the work and the output face emitting the light to the linear image sensor, wherein the erecting equal-magnification lens array includes a single lens having a chip and/or scratch, and wherein the erecting equal-magnification lens array is provided in the housing with the chip and/or scratch with an interface inside the lens, the single lens has the chip and/or scratch selected from the group consisting of at least one of following conditions (i), (ii), (iii) and (iv):

(i) the chip and/or scratch located on the light input surface of the single lens, and the interface extending from the light input surface toward the light output surface, orienting away from the linear light source, selected from the group consisting of at least one of following conditions (a), (b), (c) and (d):

(a) 20 degree or more of a direction angle of the interface θ;

(b) 0<X<0.35 D or 0.75 D<X<D of a position X of the interface in the sub scanning direction of the interface, the X measured from the opposite edge on the linear light source side, where D is an effective diameter of the single lens;

(c) less than 0.03 mm of a depth of the interface, the depth measured from the light input surface;

(d) less than 0.04 mm of a length of the interface in the main scanning direction;

(ii) the chip and/or scratch located on the light output surface of the single lens, and the interface extending from the light output surface toward the light input surface, orienting away from the linear light source; and (iii) the chip and/or scratch located on the light output surface of the single lens, and the interface extending from the light output surface toward the light input surface, orienting toward the linear light source, (iv) the chip and/or scratch located on the light input surface of the single lens, and the interface extending from the light input surface toward the light output surface, orienting toward the linear light source.

5. The method according claim 4, wherein the linear light source has a light emitting surface arranged to face the work and configured to illuminate the work.

6. The method according to claim 4, wherein the erecting equal-magnification lens array is a rod lens array including a plurality of rod lens.

* * * * *